United States Patent
Williamson et al.

(10) Patent No.: US 9,323,335 B2
(45) Date of Patent: *Apr. 26, 2016

(54) TOUCH EVENT MODEL PROGRAMMING INTERFACE

(71) Applicant: Apple Inc., Cupertino, CA (US)

(72) Inventors: Richard Williamson, Los Gatos, CA (US); Gregory Dennis Bolsinga, San Francisco, CA (US); Timothy P. Omernick, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/791,621

(22) Filed: Mar. 8, 2013

(65) Prior Publication Data

US 2013/0275888 A1    Oct. 17, 2013

Related U.S. Application Data

(63) Continuation of application No. 12/042,299, filed on Mar. 4, 2008, now Pat. No. 8,416,196.

(51) Int. Cl.
*G06F 3/01* (2006.01)
*G06F 3/0488* (2013.01)
*G06F 17/30* (2006.01)

(52) U.S. Cl.
CPC ............ *G06F 3/017* (2013.01); *G06F 3/04883* (2013.01); *G06F 17/30861* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 4,455,452 | A | 6/1984 | Schuyler |
| 5,046,434 | A | 9/1991 | Breezer et al. |
| 5,233,547 | A | 8/1993 | Kapp et al. |
| 5,252,951 | A | 10/1993 | Tannenbaum et al. |

(Continued)

FOREIGN PATENT DOCUMENTS

| | | |
|---|---|---|
| AU | 2007283771 | 4/2008 |
| CA | 2755443 A1 | 9/2010 |

(Continued)

OTHER PUBLICATIONS

Flanagan, D., "JavaScript," 5th Edition, O'Reilly Japan, Jan. 31, 2008, pp. 405-437, (English translation provided).

(Continued)

*Primary Examiner* — Kenneth B Lee, Jr.
(74) *Attorney, Agent, or Firm* — Morgan, Lewis & Bockius LLP

(57) ABSTRACT

An electronic device receives touch input signals associated with a respective region of a web page. The respective region of the web page is associated with a plurality of event handlers or event listeners including an event handler or listener for a touch event and an event handler or listener for a gesture event. In response to receiving the touch input signals, the device sends a gesture event to the web page. The gesture event corresponds to a combination of two or more touch events, and the two or more touch events correspond to the touch input signals. The device dynamically rotates an element associated with the respective region of the web page with the event handler or listener for the gesture event based on a rotation value associated with the gesture event, and sends the touch events to the web page for processing, distinct from the dynamically rotating.

40 Claims, 6 Drawing Sheets

(56) References Cited

U.S. PATENT DOCUMENTS

| | | |
|---|---|---|
| 5,454,960 A | 10/1995 | Newsom |
| 5,463,725 A | 10/1995 | Henckel et al. |
| 5,488,204 A | 1/1996 | Mead et al. |
| 5,495,566 A | 2/1996 | Kwatinez |
| 5,513,309 A | 4/1996 | Meier et al. |
| 5,534,893 A | 7/1996 | Hansen, Jr. et al. |
| 5,564,112 A | 10/1996 | Hayes et al. |
| 5,566,337 A | 10/1996 | Szymanski et al. |
| 5,570,113 A | 10/1996 | Zetts |
| 5,589,856 A | 12/1996 | Stein et al. |
| 5,627,567 A | 5/1997 | Davidson |
| 5,627,959 A | 5/1997 | Brown et al. |
| 5,676,064 A | 10/1997 | Shuert |
| 5,686,940 A | 11/1997 | Kuga |
| 5,698,822 A | 12/1997 | Haneda et al. |
| 5,708,460 A | 1/1998 | Young et al. |
| 5,745,116 A | 4/1998 | Pisutha-Arnond |
| 5,798,752 A | 8/1998 | Buxton et al. |
| 5,818,455 A | 10/1998 | Stone et al. |
| 5,844,547 A | 12/1998 | Minakuchi et al. |
| 5,864,636 A | 1/1999 | Chisaka |
| 5,867,158 A | 2/1999 | Murasaki et al. |
| 5,880,411 A | 3/1999 | Gillespie et al. |
| 5,903,902 A | 5/1999 | Orr et al. |
| 5,917,477 A | 6/1999 | Lee |
| 6,028,602 A | 2/2000 | Weidenfeller et al. |
| 6,034,688 A | 3/2000 | Greenwood et al. |
| 6,035,343 A | 3/2000 | Tsushima et al. |
| 6,061,063 A | 5/2000 | Wagner et al. |
| 6,089,371 A | 7/2000 | Lin |
| 6,141,018 A | 10/2000 | Beri et al. |
| 6,188,391 B1 | 2/2001 | Seely et al. |
| 6,259,436 B1 | 7/2001 | Moon et al. |
| 6,323,846 B1 | 11/2001 | Westerman et al. |
| 6,369,821 B2 | 4/2002 | Merrill et al. |
| 6,446,083 B1 | 9/2002 | Leight et al. |
| 6,486,896 B1 | 11/2002 | Ubillos |
| 6,489,951 B1 | 12/2002 | Wong et al. |
| 6,498,590 B1 | 12/2002 | Dietz et al. |
| 6,559,869 B1 | 5/2003 | Lui et al. |
| 6,567,102 B2 | 5/2003 | Kung |
| 6,570,557 B1 | 5/2003 | Westerman et al. |
| 6,570,594 B1 | 5/2003 | Wagner |
| 6,590,595 B1 | 7/2003 | Wagner et al. |
| 6,628,835 B1 | 9/2003 | Brill et al. |
| 6,636,242 B2 | 10/2003 | Bowman-Amuah |
| 6,639,584 B1 | 10/2003 | Li |
| 6,661,409 B2 | 12/2003 | Demartines et al. |
| 6,664,989 B1 | 12/2003 | Snyder et al. |
| 6,677,932 B1 | 1/2004 | Westerman |
| 6,677,965 B1 | 1/2004 | Ullmann et al. |
| 6,690,387 B2 | 2/2004 | Zimmerman et al. |
| 6,707,449 B2 | 3/2004 | Hinckley et al. |
| 6,714,936 B1 | 3/2004 | Nevin, III |
| 6,735,583 B1 | 5/2004 | Bjarnestam et al. |
| 6,741,996 B1 | 5/2004 | Brechner et al. |
| 6,757,673 B2 | 6/2004 | Makus et al. |
| 6,765,557 B1 | 7/2004 | Segal et al. |
| 6,778,992 B1 | 8/2004 | Searle et al. |
| 6,809,724 B1 | 10/2004 | Shiraishi et al. |
| 6,820,237 B1 | 11/2004 | Abu-Hakima et al. |
| 6,831,631 B2 | 12/2004 | Chuang |
| 6,839,721 B2 | 1/2005 | Schwols |
| 6,856,326 B1 | 2/2005 | Zhai |
| 6,903,927 B2 | 6/2005 | Anlauff |
| 6,907,575 B2 | 6/2005 | Duarte |
| 6,912,462 B2 | 6/2005 | Ogaki |
| 6,957,392 B2 | 10/2005 | Simister et al. |
| 6,958,749 B1 | 10/2005 | Matsushita |
| 6,963,937 B1 | 11/2005 | Kamper et al. |
| 6,972,776 B2 | 12/2005 | Davis et al. |
| 6,975,306 B2 | 12/2005 | Hinckley et al. |
| 6,985,137 B2 | 1/2006 | Kaikuranta |
| 6,985,178 B1 | 1/2006 | Morita et al. |
| 7,009,599 B2 | 3/2006 | Pihlaja |
| 7,009,626 B2 | 3/2006 | Anwar |
| 7,013,435 B2 | 3/2006 | Gallo et al. |
| 7,023,427 B2 | 4/2006 | Kraus et al. |
| 7,046,230 B2 | 5/2006 | Zadesky et al. |
| 7,062,090 B2 | 6/2006 | Simmons et al. |
| 7,075,512 B1 | 7/2006 | Fabre et al. |
| 7,084,859 B1 | 8/2006 | Pryor |
| 7,088,374 B2 | 8/2006 | David et al. |
| 7,102,626 B2 | 9/2006 | Denny, III |
| 7,117,453 B2 | 10/2006 | Drucker et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,173,623 B2 | 2/2007 | Calkins et al. |
| 7,181,373 B2 | 2/2007 | Le Cocq et al. |
| 7,184,796 B2 | 2/2007 | Karidis et al. |
| 7,240,291 B2 | 7/2007 | Card et al. |
| 7,337,412 B2 | 2/2008 | Guido et al. |
| 7,346,850 B2 | 3/2008 | Swartz et al. |
| 7,358,965 B2 | 4/2008 | Barabe et al. |
| 7,385,592 B2 | 6/2008 | Collins |
| 7,469,381 B2 | 12/2008 | Ording |
| 7,487,447 B1 | 2/2009 | Jerger |
| 7,499,027 B2 | 3/2009 | Brigham, II et al. |
| 7,561,159 B2 | 7/2009 | Abel et al. |
| 7,564,448 B2 | 7/2009 | Yi |
| 7,576,732 B2 | 8/2009 | Lii |
| 7,614,008 B2 | 11/2009 | Ording |
| 7,653,883 B2 | 1/2010 | Hotelling et al. |
| 7,663,607 B2 | 2/2010 | Hotelling et al. |
| 7,673,255 B2 | 3/2010 | Schechter et al. |
| 7,724,242 B2 | 5/2010 | Hillis et al. |
| 7,750,893 B2 | 7/2010 | Hashimoto et al. |
| 7,786,975 B2 | 8/2010 | Ording et al. |
| 7,812,826 B2 | 10/2010 | Ording et al. |
| 7,843,427 B2 | 11/2010 | Ording et al. |
| 7,844,915 B2 | 11/2010 | Platzer et al. |
| 7,864,037 B2 | 1/2011 | Miller |
| 7,872,652 B2 | 1/2011 | Platzer et al. |
| 7,900,156 B2 | 3/2011 | Andre et al. |
| 7,903,115 B2 | 3/2011 | Platzer et al. |
| 7,917,584 B2 | 3/2011 | Arthursson |
| 7,925,996 B2 | 4/2011 | Hofmeister et al. |
| 7,941,760 B2 | 5/2011 | Kocienda et al. |
| 7,962,862 B2 | 6/2011 | Kulp et al. |
| 7,966,578 B2 | 6/2011 | Tolmasky et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | Ho et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,400,416 B2 | 3/2013 | Ho et al. |
| 8,416,196 B2 * | 4/2013 | Williamson et al. ......... 345/173 |
| 8,428,893 B2 | 4/2013 | Moore et al. |
| 8,434,003 B2 | 4/2013 | Zalewski et al. |
| 8,436,815 B2 | 5/2013 | Mazeev et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 | 10/2013 | Rekimoto |
| 8,645,827 B2 | 2/2014 | Beaver et al. |
| 8,682,602 B2 | 3/2014 | Moore et al. |
| 2001/0009033 A1 | 7/2001 | Morisaki et al. |
| 2001/0011998 A1 | 8/2001 | Agata et al. |
| 2001/0012001 A1 | 8/2001 | Rekimoto et al. |
| 2001/0028369 A1 | 10/2001 | Gallo et al. |

(56) References Cited

U.S. PATENT DOCUMENTS

| | | |
|---|---|---|
| 2001/0045949 A1 | 11/2001 | Chithambaram et al. |
| 2002/0015024 A1 | 2/2002 | Westerman et al. |
| 2002/0036618 A1 | 3/2002 | Wakai et al. |
| 2002/0101418 A1 | 8/2002 | Vernier et al. |
| 2002/0191029 A1 | 12/2002 | Gillespie et al. |
| 2002/0194589 A1 | 12/2002 | Cristofalo et al. |
| 2003/0071850 A1 | 4/2003 | Geidl |
| 2003/0071858 A1 | 4/2003 | Morohoshi |
| 2003/0080946 A1 | 5/2003 | Chuang |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0122787 A1 | 7/2003 | Zimmerman et al. |
| 2003/0132959 A1 | 7/2003 | Simister et al. |
| 2003/0146941 A1 | 8/2003 | Bailey et al. |
| 2003/0160832 A1 | 8/2003 | Ridgley et al. |
| 2003/0174149 A1 | 9/2003 | Fujisaki et al. |
| 2003/0184525 A1 | 10/2003 | Tsai |
| 2003/0197689 A1 | 10/2003 | May |
| 2003/0197744 A1 | 10/2003 | Irvine |
| 2003/0210258 A1 | 11/2003 | Williams |
| 2003/0222917 A1 | 12/2003 | Trantow |
| 2004/0001627 A1 | 1/2004 | Simmons et al. |
| 2004/0021676 A1 | 2/2004 | Chen et al. |
| 2004/0021698 A1 | 2/2004 | Baldwin et al. |
| 2004/0027398 A1 | 2/2004 | Jaeger |
| 2004/0039474 A1 | 2/2004 | Kontani |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt |
| 2004/0210847 A1 | 10/2004 | Berson et al. |
| 2004/0215643 A1 | 10/2004 | Brechner et al. |
| 2004/0222992 A1 | 11/2004 | Calkins et al. |
| 2004/0224638 A1 | 11/2004 | Fadell et al. |
| 2004/0263486 A1 | 12/2004 | Seni |
| 2005/0005241 A1 | 1/2005 | Hunleth et al. |
| 2005/0008343 A1 | 1/2005 | Frohlich et al. |
| 2005/0012723 A1 | 1/2005 | Pallakoff |
| 2005/0017957 A1 | 1/2005 | Yi |
| 2005/0024341 A1 | 2/2005 | Gillespie et al. |
| 2005/0027666 A1 | 2/2005 | Beck, Jr. et al. |
| 2005/0057524 A1 | 3/2005 | Hill et al. |
| 2005/0088443 A1 | 4/2005 | Blanco et al. |
| 2005/0122806 A1 | 6/2005 | Arakawa et al. |
| 2005/0145807 A1 | 7/2005 | Lapstun et al. |
| 2005/0162402 A1 | 7/2005 | Watanachote |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0193015 A1 | 9/2005 | Logston et al. |
| 2005/0195154 A1 | 9/2005 | Robbins et al. |
| 2005/0198588 A1 | 9/2005 | Lin et al. |
| 2005/0210419 A1 | 9/2005 | Kela et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0010400 A1 | 1/2006 | Dehlin et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028455 A1 | 2/2006 | Hinckley et al. |
| 2006/0031786 A1 | 2/2006 | Hillis et al. |
| 2006/0036955 A1 | 2/2006 | Baudisch et al. |
| 2006/0038796 A1 | 2/2006 | Hinckley et al. |
| 2006/0048073 A1 | 3/2006 | Jarrett et al. |
| 2006/0055669 A1 | 3/2006 | Das |
| 2006/0061551 A1 | 3/2006 | Fateh |
| 2006/0066588 A1 | 3/2006 | Lyon et al. |
| 2006/0077183 A1 | 4/2006 | Studt |
| 2006/0077544 A1 | 4/2006 | Stark |
| 2006/0082549 A1 | 4/2006 | Hoshino et al. |
| 2006/0094502 A1 | 5/2006 | Katayama et al. |
| 2006/0097991 A1 | 5/2006 | Hotelling et al. |
| 2006/0112335 A1 | 5/2006 | Hofmeister et al. |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. |
| 2006/0181510 A1 | 8/2006 | Faith |
| 2006/0187215 A1 | 8/2006 | Rosenberg et al. |
| 2006/0190833 A1 | 8/2006 | SanGiovanni et al. |
| 2006/0197753 A1 | 9/2006 | Hotelling |
| 2006/0236263 A1 | 10/2006 | Bathiche et al. |
| 2006/0238495 A1 | 10/2006 | Davis |
| 2006/0242602 A1 | 10/2006 | Schechter et al. |
| 2006/0242607 A1 | 10/2006 | Hudson |
| 2006/0262104 A1 | 11/2006 | Sullivan et al. |
| 2006/0279548 A1 | 12/2006 | Geaghan |
| 2006/0284792 A1 | 12/2006 | Foxlin |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0036346 A1 | 2/2007 | Kwon |
| 2007/0046643 A1 | 3/2007 | Hillis et al. |
| 2007/0050469 A1 | 3/2007 | Gupta et al. |
| 2007/0055967 A1 | 3/2007 | Poff et al. |
| 2007/0061126 A1 | 3/2007 | Russo et al. |
| 2007/0064004 A1 | 3/2007 | Bonner et al. |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0089069 A1 | 4/2007 | Hsieh et al. |
| 2007/0109275 A1 | 5/2007 | Chuang |
| 2007/0120835 A1 | 5/2007 | Sato |
| 2007/0132789 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | van Os et al. |
| 2007/0174257 A1 | 7/2007 | Howard |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. |
| 2007/0198926 A1 | 8/2007 | Joguet et al. |
| 2007/0214436 A1 | 9/2007 | Myers, Jr. |
| 2007/0214462 A1 | 9/2007 | Boillot |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. |
| 2007/0252821 A1 | 11/2007 | Hollemans et al. |
| 2007/0262964 A1 | 11/2007 | Zotov et al. |
| 2007/0277124 A1 | 11/2007 | Shin et al. |
| 2007/0288856 A1 | 12/2007 | Butlin et al. |
| 2007/0291009 A1 | 12/2007 | Wright et al. |
| 2008/0001923 A1 | 1/2008 | Hall et al. |
| 2008/0005703 A1 | 1/2008 | Radivojevic et al. |
| 2008/0012835 A1 | 1/2008 | Rimon et al. |
| 2008/0016096 A1 | 1/2008 | Wilding et al. |
| 2008/0028327 A1 | 1/2008 | Hirota et al. |
| 2008/0034029 A1 | 2/2008 | Fang et al. |
| 2008/0036743 A1 | 2/2008 | Westerman et al. |
| 2008/0043020 A1 | 2/2008 | Snow et al. |
| 2008/0048978 A1 | 2/2008 | Trent, Jr. et al. |
| 2008/0094356 A1 | 4/2008 | Ording et al. |
| 2008/0094368 A1 | 4/2008 | Ording et al. |

(56) References Cited

U.S. PATENT DOCUMENTS

| | | |
|---|---|---|
| 2008/0104544 A1 | 5/2008 | Collins et al. |
| 2008/0114614 A1 | 5/2008 | Mahesh et al. |
| 2008/0120576 A1 | 5/2008 | Kariathungal et al. |
| 2008/0122806 A1 | 5/2008 | Ahn |
| 2008/0158191 A1 | 7/2008 | Yang et al. |
| 2008/0162751 A1 | 7/2008 | Wilson |
| 2008/0165132 A1 | 7/2008 | Weiss et al. |
| 2008/0165136 A1 | 7/2008 | Christie et al. |
| 2008/0165140 A1 | 7/2008 | Christie et al. |
| 2008/0165141 A1 | 7/2008 | Christie |
| 2008/0165160 A1 | 7/2008 | Kocienda et al. |
| 2008/0166049 A1 | 7/2008 | Wang et al. |
| 2008/0168388 A1 | 7/2008 | Decker |
| 2008/0168395 A1 | 7/2008 | Ording et al. |
| 2008/0168402 A1 | 7/2008 | Blumenberg |
| 2008/0168405 A1 | 7/2008 | Tolmasky et al. |
| 2008/0172633 A1 | 7/2008 | Jeon et al. |
| 2008/0207130 A1 | 8/2008 | Kunii |
| 2008/0218489 A1 | 9/2008 | Park et al. |
| 2008/0231610 A1 | 9/2008 | Hotelling et al. |
| 2009/0049388 A1 | 2/2009 | Taib et al. |
| 2009/0051671 A1 | 2/2009 | Konstas |
| 2009/0058830 A1 | 3/2009 | Herz et al. |
| 2009/0064047 A1 | 3/2009 | Shim et al. |
| 2009/0207140 A1 | 8/2009 | Hansson |
| 2009/0211891 A1 | 8/2009 | Lai et al. |
| 2009/0225037 A1 | 9/2009 | Williamson et al. |
| 2009/0225038 A1 | 9/2009 | Bolsinga et al. |
| 2009/0225039 A1 | 9/2009 | Williamson et al. |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0244020 A1 | 10/2009 | Sjolin |
| 2009/0251434 A1 | 10/2009 | Rimon et al. |
| 2009/0259969 A1 | 10/2009 | Pallakoff |
| 2009/0262087 A1 | 10/2009 | Kim |
| 2009/0273571 A1 | 11/2009 | Bowens |
| 2009/0282332 A1 | 11/2009 | Porat |
| 2009/0284479 A1 | 11/2009 | Dennis et al. |
| 2009/0300530 A1 | 12/2009 | Falchuk |
| 2009/0304281 A1 | 12/2009 | Yipu |
| 2009/0309847 A1 | 12/2009 | Russell et al. |
| 2009/0322687 A1 | 12/2009 | Duncan et al. |
| 2009/0322699 A1 | 12/2009 | Hansson |
| 2009/0322700 A1 | 12/2009 | D'Souza et al. |
| 2010/0013676 A1 | 1/2010 | Do et al. |
| 2010/0020025 A1 | 1/2010 | Lemort et al. |
| 2010/0020221 A1 | 1/2010 | Tupman et al. |
| 2010/0030612 A1 | 2/2010 | Kim et al. |
| 2010/0046850 A1 | 2/2010 | Ho et al. |
| 2010/0085323 A1 | 4/2010 | Bogue |
| 2010/0107116 A1 | 4/2010 | Rieman et al. |
| 2010/0146458 A1 | 6/2010 | Wadekar |
| 2010/0149122 A1 | 6/2010 | Lin |
| 2010/0156804 A1 | 6/2010 | Young |
| 2010/0169841 A1 | 7/2010 | Singh |
| 2010/0177053 A2 | 7/2010 | Yasutake |
| 2010/0182248 A1 | 7/2010 | Chun |
| 2010/0235118 A1 | 9/2010 | Moore et al. |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299594 A1 | 11/2010 | Zalewski et al. |
| 2010/0325575 A1 | 12/2010 | Platzer et al. |
| 2011/0037714 A1 | 2/2011 | Seo et al. |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0102464 A1 | 5/2011 | Godavari |
| 2011/0115745 A1 | 5/2011 | Cabrera Cordon et al. |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0242032 A1 | 10/2011 | Seo et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0291951 A1 | 12/2011 | Tong |
| 2011/0295596 A1 | 12/2011 | Hung et al. |
| 2011/0310046 A1 | 12/2011 | Beaver et al. |
| 2011/0310047 A1 | 12/2011 | Moore et al. |
| 2011/0314430 A1 | 12/2011 | Blumenberg |
| 2011/0321125 A1 | 12/2011 | Kyohgoku et al. |
| 2012/0023509 A1 | 1/2012 | Blumenberg |
| 2012/0026104 A1 | 2/2012 | Ho et al. |
| 2012/0242584 A1 | 9/2012 | Tuli |
| 2012/0278725 A1 | 11/2012 | Gordon et al. |
| 2013/0009986 A1 | 1/2013 | Shah et al. |
| 2013/0016039 A1 | 1/2013 | Moore et al. |
| 2013/0069899 A1 | 3/2013 | Beaver et al. |
| 2013/0120280 A1 | 5/2013 | Kukulski |
| 2013/0244574 A1 | 9/2013 | Okuno et al. |
| 2013/0246861 A1 | 9/2013 | Colley et al. |

FOREIGN PATENT DOCUMENTS

| | | |
|---|---|---|
| CN | 1326564 A | 12/2001 |
| CN | 1331815 A | 1/2002 |
| CN | 1422481 A | 6/2003 |
| CN | 1695105 A | 11/2005 |
| CN | 1704886 A | 12/2005 |
| CN | 1797308 A | 7/2006 |
| CN | 1841284 A | 10/2006 |
| CN | 1845046 A | 10/2006 |
| CN | 1860429 A | 11/2006 |
| CN | 1967458 A | 5/2007 |
| CN | 101410781 A | 4/2009 |
| CN | 101526880 A | 9/2009 |
| CN | 101529368 A | 9/2009 |
| CN | 101727240 A | 6/2010 |
| DE | 202007013923 U1 | 12/2007 |
| DE | 202005021427 U1 | 2/2008 |
| EP | 0538705 A1 | 4/1993 |
| EP | 0626635 A2 | 11/1994 |
| EP | 0635779 A1 | 1/1995 |
| EP | 0701220 A1 | 3/1996 |
| EP | 0712825 A1 | 5/1996 |
| EP | 0880091 A2 | 11/1998 |
| EP | 1 517 228 A2 | 3/2005 |
| EP | 2031837 A2 | 3/2009 |
| EP | 2 141 576 A2 | 1/2010 |
| EP | 1964022 B1 | 3/2010 |
| EP | 2 184 673 A1 | 5/2010 |
| EP | 2 390 766 A1 | 11/2011 |
| GB | 1517521 A1 | 7/1978 |
| GB | 2 319 591 A | 5/1998 |
| GB | 2 351 639 A | 1/2001 |
| GB | 2373778 A | 10/2002 |
| GB | 2 404 547 A | 7/2003 |
| JP | 02-140822 | 5/1990 |
| JP | 03-271976 | 12/1991 |
| JP | 05 298002 | 11/1993 |
| JP | H10-500509 | 1/1998 |
| JP | H11-085354 | 3/1999 |
| JP | 2000-163031 | 6/2000 |
| JP | 2000-163443 | 6/2000 |
| JP | 2000 222130 | 8/2000 |
| JP | 2000-322199 | 11/2000 |
| JP | 2001 290585 | 10/2001 |
| JP | 2003 296024 | 10/2003 |
| JP | 2005 056286 | 3/2005 |
| JP | 2005 082086 | 3/2005 |
| JP | 2005 242669 | 9/2005 |
| JP | 2005 322088 | 11/2005 |
| JP | 2006-085356 | 3/2006 |
| JP | 2006 102275 | 4/2006 |
| JP | 2008-503125 | 1/2008 |
| JP | 2008-508601 | 3/2008 |
| JP | 2008 146165 | 6/2008 |
| JP | 2008 312153 | 12/2008 |

(56) References Cited

FOREIGN PATENT DOCUMENTS

| | | | |
|---|---|---|---|
| JP | 2010-503124 A | 1/2010 | |
| JP | 2012-014299 | 1/2012 | |
| KR | 2009-0057304 | 6/2009 | |
| KR | 2009-0057421 | 6/2009 | |
| WO | WO 00/38042 A1 | 6/2000 | |
| WO | WO 01/29702 A2 | 4/2001 | |
| WO | WO 01/77792 A2 | 10/2001 | |
| WO | WO 02/01338 A1 | 1/2002 | |
| WO | WO 02/08881 A | 1/2002 | |
| WO | WO 02/13176 A2 | 2/2002 | |
| WO | WO 02/21338 A2 | 3/2002 | |
| WO | WO 03/060622 A2 | 7/2003 | |
| WO | WO 03/081458 A1 | 10/2003 | |
| WO | WO 04/001560 A1 | 12/2003 | |
| WO | WO 2005/029460 A1 | 3/2005 | |
| WO | WO 2005/052773 A2 | 6/2005 | |
| WO | WO 2006/003590 A2 | 1/2006 | |
| WO | WO 2006/003591 A2 | 1/2006 | |
| WO | WO 2006/020304 A2 | 2/2006 | |
| WO | WO 2006/020305 A2 | 2/2006 | |
| WO | WO 2006/026183 A2 | 3/2006 | |
| WO | WO 2006/045530 A2 | 5/2006 | |
| WO | WO 2006/067771 A2 | 6/2006 | |
| WO | WO 2006/094308 A2 | 9/2006 | |
| WO | WO 2007/037806 A1 | 4/2007 | |
| WO | WO 2007/067858 | 6/2007 | |
| WO | WO 2007/079425 A2 | 7/2007 | |
| WO | WO 2007/089766 A2 | 8/2007 | |
| WO | WO 2008/020446 A1 | 2/2008 | |
| WO | WO 2008/030779 A2 | 3/2008 | |
| WO | WO 2008/030879 A2 | 3/2008 | |
| WO | WO 2008/030880 A1 | 3/2008 | |
| WO | WO 2008/085846 A2 | 7/2008 | |
| WO | WO 2008/085848 A1 | 7/2008 | |
| WO | WO 2008/085855 A1 | 7/2008 | |
| WO | WO 2008/085871 A1 | 7/2008 | |
| WO | WO 2008/085877 A1 | 7/2008 | |
| WO | WO 2006/128248 A1 | 12/2008 | |
| WO | WO 2008/148021 A2 | 12/2008 | |
| WO | WO 2009/018314 A2 | 2/2009 | |
| WO | WO 2009/111189 A1 | 9/2009 | |
| WO | WO 2009/111458 A1 | 9/2009 | |
| WO | WO 2009/111460 A1 | 9/2009 | |
| WO | WO 2009/111469 A1 | 9/2009 | |

OTHER PUBLICATIONS

Office Action dated Oct. 31, 2013, received in Chinese Patent Application No. 201080020598.0, which corresponds to U.S. Appl. No. 12/566,660, 2 pages (Moore).
Office Action dated Nov. 18, 2013, received in Japanese Patent Application No. 2013 515382, which corresponds to U.S. Appl. No. 12/892,848, 37 pages (Dale).
Office Action dated Dec. 5, 2013, received in Korean Patent Application No. 2012 7029618, which corresponds to U.S. Appl. No. 12/892,848, 4 pages (Dale).
Notice of Allowance dated Dec. 16, 2013, received in U.S. Appl. No. 12/042,318, 51 pages (Beaver).
Notice of Allowance dated Dec. 6, 2013, received in U.S. Appl. No. 12/042,067, 12 pages (Williamson).
Final Office Action dated Dec. 11, 2013, received in U.S. Appl. No. 13/251,150, 47 pages (Blumenberg).
Office Action dated Dec. 6, 2013, received in U.S. Appl. No. 13/054,472, 42 pages (Crumly).
Notice of Allowance dated Jan. 15, 2014, received in U.S. Appl. No. 13/620,390, 28 pages (Moore).
Buxton, W. et al., "Multi-Touch Systems that I Have Known and Loved," Jan. 12, 2007, 14 pages, http://www.billbuxton.com/multitouchOverview.html.
Han, J., "Jeff Han demos his breakthrough touchscreen." TED Ideas worth spreading, Feb. 25, 2006, http://www.ted.com/talks/jeff_han_demos_his_breakthrough_touchscreen.html.
Jazzmutant, "Lemur v1.3 Documentation Addendum," Mar. 22, 2005, http://www.juzzmutant.com/support_download.php, 3 pages.
Jazzmutant, "Lemur v1.3 Examples package: CursorModes.xml," Jan. 31, 2006, http://www.juzzmutant.com/support_download.php, 4 pages.
Jazzmutant, "Lemur v1.3 Examples package: LightStepSeq.xml," Jan. 31, 2006, http://www.juzzmutant.com/support_download.php, 5 pages.
Jazzmutant Sas et al., "The Lemur Owner's Manual," Oct. 31, 2005, http://www.juzzmutant.com/support_download.php, 108 pages.
Jazzmutant, "Support," Apr. 21, 2006, http://web.archive.org/web/20060421144624/http://www.jazzmutant.com/support_download.php, 2 pages.
Justice Floyd, "UK Royal Court of Justice: [2012] EWHC 1789 (Pat)—Extracts," Jul. 4, 2013, http://www.judiciary.gov.uk/Resources/JCO/Documents/Judgments/htc-v-apple-judgment.pdf, 26 pages.
Microsoft, "Microsoft Windows Software Development Kit-Update for Windows Vista," Mar. 22, 2007, http://www.microsoft.com/en-us/download/details.aspx?displaylang=en&id=23719, 26 pages.
Microsoft, "Window Styles—Microsoft Windows SDK—Screenshot," Mar. 22, 2007, 2 pages.
Petzold, C., "Programming Microsoft Windows with C#," Jan. 18, 2002, 5 pages.
YouTube, "A Lemurized Formula," 4:07 minute video uploaded to YouTube by Sph9000 on Dec. 12, 2007, http://youtube.com/watch?v=sHAMyQak-LM, 1 page.
Office Action dated Jun. 3, 2013, received in Japanese Patent Application No. 2012500844, which corresponds to U.S. Appl. No. 12/566,660, 5 pages (Moore).
Notice of Allowance dated May 29, 2013, received in Korean Patent Application No. 10-2011-7024288, which corresponds to U.S. Appl. No. 12/566,660, 2 pages (Moore).
Notice of Allowance dated May 15, 2013, received in U.S. Appl. No. 12/892,848, 37 pages (Dale).
Notice of Allowance dated Jun. 27, 2013, received in U.S. Appl. No. 13/077,925, 29 pages (Shaffer).
Office Action dated Apr. 22, 2013, received in Chinese Patent Application No. 201120580018.5, which corresponds to U.S. Appl. No. 13/077,925, 4 pages (Shaffer).
Summons to oral proceedings dated May 15, 2013, received in European Patent Application No. 09154313.2, which corresponds to U.S. Appl. No. 12/042,318, 30 pages (Beaver).
Notice of Allowance dated Jun. 13, 2013, received in U.S. Appl. No. 13/077,927, 29 pages (Shaffer).
Final Office Action dated May 15, 2013, received in U.S. Appl. No. 13/221,836, 27 pages (Blumenberg).
Office Action dated Jun. 7, 2013, received in U.S. Appl. No. 13/215,150, 43 pages (Blumenberg).
Office Action dated Apr. 23, 2013, received in U.S. Appl. No. 13/251,152, 29 pages (Blumenberg).
Office Action dated Jun. 26, 2013, received in U.S. Appl. No. 13/867,950, 21 pages (Platzer).
Flanagan, D., "JavaScript," 5th Edition, O'Reilly Japan, Jan. 31, 2008, pp. 405-437, (No English translation provided).
Office Action dated Oct. 24, 2013, received in U.S. Appl. No. 12/789,695, 24 pages (Shaffer).
Decision to Grant dated Nov. 1, 2013, received in Japanese Patent Application No. 2012 186775, which corresponds to U.S. Appl. No. 12/042,318, 3 pages (Beaver).
Notification of Grant dated Nov. 6, 2013, received in Chinese Patent Application No. 200980000013.6, which corresponds to U.S. Appl. No. 12/042,299, 2 pages (Williamson).
Summons to attend oral proceedings dated Oct. 30, 2013, received in European Patent Application No. 09700007.9, which corresponds to U.S. Appl. No. 12/042,299, 5 pages. (Williamson).
Summons to attend oral proceedings dated Oct. 30, 2013, received in European Patent Application No. 11184226.6, which corresponds to U.S. Appl. No. 12/042,299, 5 pages (Williamson).
Summons to attend oral proceedings dated Oct. 30, 2013, received in European Patent Application No. 11184224.1, which corresponds to U.S. Appl. No. 12/042,299, 5 pages (Williamson).

(56) References Cited

OTHER PUBLICATIONS

Summons to attend oral proceedings dated Oct. 30, 2013, received in European Patent Application No. 11184223.3, which corresponds to U.S. Appl. No. 12/042,299, 5 pages (Williamson).
Summons to attend oral proceedings dated Oct. 30, 2013, received in European Patent Application No. 11184222.5, which corresponds to U.S. Appl. No. 12/042,299, 5 pages (Williamson).
Office Action dated Sep. 6, 2013, received in Japanese Patent Application No. 2012 088747, which corresponds to U.S. Appl. No. 12/042,299, 4 pages (Williamson).
Office Action dated Oct. 24, 2013, received in U.S. Appl. No. 13/163,624, 16 pages (Williamson).
Office Action dated Oct. 24, 2013, received in U.S. Appl. No. 13/163,626, 16 pages (Williamson).
Office Action dated Sep. 2, 2013, received in Japanese Patent Application No. 2010 502357, which corresponds to U.S. Appl. No. 12/042,237, 11 pages (Bolsinga).
Office Action dated Sep. 24, 2013, received in Japanese Patent Application No. 2012 218235, which corresponds to U.S. Appl. No. 12/042,237, 6 pages (Bolsinga).
Office Action dated Jul. 2, 2013, received in Chinese Patent Application No. 200880001827.7, which corresponds to U.S. Appl. No. 11/620,717, 7 pages (Platzer).
Office Action dated Nov. 26, 2012, received in European Patent Application No. 08 712 964.9, which corresponds to U.S. Appl. No. 11/620,717, 6 pages (Platzer).
Office Action dated Oct. 30, 2013, received in U.S. Appl. No. 13/221,836, 31 pages (Blumenberg).
Final Office Action dated Oct. 2, 2013, received in U.S. Appl. No. 13/251,146, 24 pages (Blumenberg).
Final Office Action dated Oct. 18, 2013, received in U.S. Appl. No. 13/251,152, 38 pages (Blumenberg).
Ex parte reexamination communication transmittal form, dated Jul. 26, 2013, received in Reexamination No. 90/012,332, 61 pages.
Notice of Allowance dated Oct. 22, 2013, received in U.S. Appl. No. 13/867,950, 12 pages (Platzer).
International Preliminary Report on Patentability, dated Jul. 4, 2013, received in International Patent Application No. PCT/US2011/065859, which corresponds to U.S. Appl. No. 13/077,925, 18 pages. (Shaffer).
Office Action dated Jun. 19, 2013, received in European Patent Application No. 10 712 825.8, which corresponds to U.S. Appl. No. 12/566,660, 5 pages (Moore).
Office Action dated Jun. 28, 2013, received in Australian Patent Application No. 2011209720, which corresponds to U.S. Appl. No. 12/789,695, 4 pages (Shaffer).
Office Action dated Aug. 26, 2013, received in Chinese Patent Application No. 201110063183.8, which corresponds to U.S. Appl. No. 12/789,695, (Shaffer).
Office Action dated Jul. 26, 2013, received in European Patent Application No. 11 152 015.1, which corresponds to U.S. Appl. No. 12/789,695, 6 pages (Shaffer).
Office Action dated Aug. 14, 2013, received in Australian Patent Application No. 2011268047, which corresponds to U.S. Appl. No. 12/892,848, 2 pages (Dale).
Office Action dated Aug. 22, 2013, received in European Patent Application No. 11 727 371.4, which corresponds to U.S. Appl. No. 12/892,848, 6 pages (Dale).
Final Office Action dated Jul. 19, 2013, received in U.S. Appl. No. 12/892,851, 21 pages (Dale).
Notice of Grant dated Jul. 26, 2013, received in Chinese Patent Application No. 201120580018.5, which corresponds to U.S. Appl. No. 13/077,925, 7 pages (Shaffer).
Notice of Acceptance dated Jul. 3, 2013, received in Australian Patent Application No. 2011205170, which corresponds to U.S. Appl. No. 12/042,318, 2 pages (Beaver).
Office Action dated Aug. 5, 2013, received in Chinese Patent Application No. 201110148738.9, which corresponds to U.S. Appl. No. 12/042,318, 6 pages (Beaver).
Notice of Allowance dated Sep. 27, 2013, received in U.S. Appl. No. 12/042,067, 16 pages (Williamson).
Office Action dated Jul. 3, 2013, received in Chinese Patent Application No. 200980000013.6, which corresponds to U.S. Appl. No. 12/042,299, 6 pages (Williamson).
Final Office Action dated Sep. 9, 2013, received in U.S. Appl. No. 13/077,931, 30 pages (Shaffer).
Final Office Action dated Sep. 23, 2013, received in U.S. Appl. No. 13/251,121, 28 pages (Blumenberg).
Office Action dated Oct. 9, 2012, received in U.S. Appl. No. 13/084,472, 15 pages (Crumly).
Final Office Action dated Jun. 20, 2013, received in U.S. Appl. No. 13/084,472, 20 pages (Crumly).
Notice of Allowance dated Jul. 24, 2013, received in U.S. Appl. No. 13/670,378, 20 days (Beaver).
Allen, J., "Override the GNU C library—painlessly," ibm.com, Apr. 2002, 4 pages.
Anonymous, "Firegestures: Firefox Extension," Internet Article, Oct. 27, 2009, 2 pages, http://xuldev.org/firegestures/.
Anonymous, "Firegestures: Changelog," Internet Article, Oct. 28, 2009, 8 pages. http://xuldev.org/firegestures/changelog.php.
Anonymous, "Firegestures Version History," Internet Article, Oct. 28, 2009, 6 pages, http://addons.mozilla.org/en-US/firefox/addons/version/6366.
Apple, "Safari Web Content Guide for iPhone," Apple Inc., Feb. 5, 2005, 96 pages.
Chartier, D., "Apple releases iOS 4.3 beta for developers," Macworld.com, Jan. 12, 2011, http://www.macworld.com/articie/1157114/ios_4_3.html, 7 pages.
Chen, T., "The Web is Everywhere," IEEE Communications Magazine, Feb. 5, 2008, 1 page.
Holzner, "Built-in JavaScript Objects," JavaScript Complete, 1998, McGraw/Hill, New York, pp. 71-79.
KennyTM, "UIGestureRecognizer," from iPhone Development Wiki, Oct. 31, 2009, 3 pages, http://iphonedevwiki.net/index.php?title=UIGestureRecognizer&oldid=319http://iphonedevwiki.net/index.php?title=UIGestureRecognizer&action=history.
Masui et al., "Elastic Graphical Interfaces for Precise Data Manipulation," ACM Conference on Human Factors in Computing Systems (CHI '95), Apr. 1995, Conference Companion, ACM press, pp. 143-144.
Pixley, "Document Object Model (DOM) Level 2 Events Specification Version 1.0," W3C Recommendation, 50 pages. Nov. 13, 2000.
Pogue, D., "Windows Vista for Starters. The Missing Manual," Safari Books Online, Jan. 25, 2007, 18 pages.
Raiha, L., "Delegation: Dynamic Specialization," Proceeding of the conference on TRI-Ada '94, pp. 172-179.
Rogers, M., "It's for You! An iPhone Development Primer for the Busy College Professor," Journal of Computing Sciences in Colleges, vol. 25, No. 1, Oct. 1, 2009, pp. 94-101.
Invitation to Pay Additional Fees dated Jul. 13, 2010, received in International Application No. PCT/US2010/027118, which corresponds to U.S. Appl. No. 12/566,660, 7 pages (Moore).
International Search Report and Written Opinion dated Oct. 5, 2010, received in International Application No. PCT/US2010/027118, which corresponds to U.S. Appl. No. 12/566,660, 19 pages (Moore).
International Preliminary Report on Patentability dated Sep. 20, 2011, received in International Application No. PCT/US2010/027118, which corresponds to U.S. Appl. No. 12/566,660, 10 pages (Moore).
European Search Report dated Dec. 7, 2011, received in European Patent Application No. 11184186.2, which corresponds to U.S. Appl. No. 12/566,660, 6 pages (Moore).
International Search Report and Written Opinion dated May 20, 2011, received in International Application No. PCT/US2011/022516, which corresponds to U.S. Appl. No. 12/789,695, 6 pages (Moore).
International Search Report and Written Opinion dated Dec. 13, 2011, received in International Patent Application No. PCT/US2011/039583, which corresponds to U.S. Appl. No. 12/892,848, 12 pages (Dale).

(56) References Cited

OTHER PUBLICATIONS

Search Report dated Jun. 2012, received in Dutch Patent Application No. 2007993, which corresponds to U.S. Appl. No. 13/077,925, 6 pages (Shaffer).
Invitation to Pay Additional Fees dated Mar. 12, 2012, received in International Application No. PCT/US2011/065859, which corresponds to U.S. Appl. No. 13/077,925, 10 pages (Shaffer).
International Search Report and Written Opinion dated Jun. 1, 2012, received in International Application No. PCT/US2011/065859, which corresponds to U.S. Appl. No. 13/077,925, 22 pages (Shaffer).
International Search Report dated Apr. 16, 2009, received in International Application No. PCT/US2009/034772, which corresponds to U.S. Appl. No. 12/042,318, 3 pages (Platzer).
European Search Report dated Apr. 21, 2009, received in European Application No. 09154313.2, which corresponds to U.S. Appl. No. 12/042,318, 6 pages (Platzer).
European Search Report dated Nov. 23, 2011, received in European Patent Application No. 111841672, which corresponds to U.S. Appl. No. 12/042,318, 6 pages (Beaver).
European Search Report dated Nov. 24, 2011, received in European Patent Application No. 11184169.8, which corresponds to U.S. Appl. No. 12/042,318, 6 pages (Beaver).
European Search Report dated Nov. 18, 2011, received in European Patent Application No. 11184170.6, which corresponds to U.S. Appl. No. 12/042,318, 6 pages (Beaver).
European Search Report dated Nov. 18, 2011, received in European Patent Application No. 11184172.2, which corresponds to U.S. Appl. No. 12/042,318, 6 pages (Beaver).
European Search Report dated Nov. 30. 2011, received in European Patent Application No. 11184409.8, which corresponds to U.S. Appl. No. 12/042,318, 6 pages (Beaver).
European Search Report dated Jul. 9, 2012, received in European Patent Application No. 12156395.1, which corresponds to U.S. Appl. No. 12/042,318, 8 pages (Beaver).
Internationai Search Report and Written Opinion dated Jul. 3, 2009, received in International Application No. PCT/US2009/035856, which corresponds to U.S. Appl. No. 12/042,067, 15 pages (Williamson).
International Preliminary Report on Patentability dated Sep. 16, 2010, received in International Application No. PCT/US2009/035856, which corresponds to U.S. Appl. No. 12/042,067, 8 pages (Williamson).
International Search Report and Written Opinion dated Nov. 11, 2009, received in International Application No. PCT/US2009/035874, which corresponds to U.S. Appl. No. 12/042,299, 7 pages (Williamson).
Internationai Preliminary Report on Patentability dated Sep. 16, 2010, received in International Application No. PCT/US2009/035874, which corresponds to U.S. Appl. No. 12/042,299, 8 pages (Williamson).
European Search Report dated Jan. 13, 2012, received in European Patent Application No. 11184226.6, which corresponds to U.S. Appl. No. 12/042,299, 7 pages (Williamson).
European Search Report dated Jan. 13, 2012, received in European Patent Application No. 11184224.1, which corresponds to U.S. Appl. No. 12/042,299, 7 pages (Williamson).
International Search Report and Written Opinion dated Jul. 31, 2008, received in International Application No. PCT/US2008/000058, which corresponds to U.S. Appl. No. 11/620,709 (Platzer).
International Preliminary Report on Patentability dated Jul. 7, 2009, received in International Application No. PCT/US2008/000058, which corresponds to U.S. Appl. No. 11/620,709 (Platzer).
International Search Report and Written Opinion dated Apr. 22, 2008, received in International Application No. PCT/US2008/000060, which corresponds to U.S. Appl. No. 11/620,727 (Blumenberg).
International Preliminary Report on Patentability dated Jul. 7, 2009, received in International Application No. PCT/US2008/000060, which corresponds to U.S. Appl. No. 11/620,727 (Blumenberg).
Internationai Search Report and Written Opinion dated May 2, 2008, received in Internationai Application No. PCT/US2008/000069, which corresponds to U.S. Appl. No. 11/620,715 (Platzer).
International Preliminary Report on Patentability dated Jul. 7, 2009, received in International Application No. PCT/US2008/000069, which corresponds to U.S. Appl. No. 11/620,715 (Platzer).
International Search Report and Written Opinion dated Jun. 4, 2008, received in International Application No. PCT/US2008/000089, which corresponds to U.S. Appl. No. 11/620,717 (Platzer).
International Preliminary Report on Patentability dated Jul. 7, 2009, received in International Application No. PCT/US2008/000089, which corresponds to U.S. Appl. No. 11/620,717 (Platzer).
International Search Report and Written Opinion dated Jun. 3, 2008, received in International Application No. PCT/US2008/000103, which corresponds to U.S. Appl. No. 11/620,723 (Platzer).
International Preliminary Report on Patentability dated Jul. 7, 2009, received in International Application No. PCT/US2008/000103, which corresponds to U.S. Appl. No. 11/620,723 (Platzer).
Office Action dated Dec. 9, 2011, received in U.S. Appl. No. 12/566,660, 14 pages (Moore).
Notice of Allowance dated May 24, 2012, received in U.S. Appl. No. 12/566,660, 10 pages (Moore).
Notice of Allowance dated Jul. 26, 2012, received in U.S. Appl. No. 12/566,660, 9 pages (Moore).
Patent Examination Report No. 1 dated Oct. 17, 2012, received in Australian Patent Application No. 2010226120, which corresponds to U.S. Appl. No. 12/566,660, 3 pages (Moore).
Notice of Allowance dated Nov. 2, 2012, received in Canadian Patent Application No. 2755443, which corresponds to U.S. Appl. No. 12/566,660, 1 page (Moore).
Office Action dated Mar. 4, 2013, received in U.S. Appl. No. 12/789,695, 29 pages (Shaffer).
Office Action dated Oct. 22, 2012, received in Chinese Patent Application No. 201110063183.8, which corresponds to U.S. Appl. No. 12/789,695, 8 pages (Shaffer).
Office Action dated Oct. 9, 2012, received in U.S. Appl. No. 12/892,851, 22 pages (Dale).
Office Action dated Oct. 19, 2012, received in Chinese Patent Application No. 201120580018.5, which corresponds to U.S. Appl. No. 13/077,925, 4 pages (Shaffer).
Office Action dated Feb. 16, 2011, received in U.S. Appl. No. 12/042,318, 26 pages (Beaver).
Final Office Action dated Sep. 15, 2011, received in U.S. Appl. No. 12/042,318, 46 pages (Beaver).
Office Action dated Feb. 25, 2011, received in Australian Patent Application No. 2009200493, which corresponds to U.S. Appl. No. 12/042,318, 3 pages (Beaver).
Office Action dated Aug. 9, 2011, received in Australian Patent Application No. 2009200493, which corresponds to U.S. Appl. No. 12/042,318, 2 pages (Beaver).
Office Action dated Feb. 22, 2012, received in Australian Patent Application No. 2011205170, which corresponds to U.S. Appl. No. 12/042,318, 3 pages (Beaver).
Office Action dated Dec. 13, 2011, received in Austrailan Patent Application No. 2011101154, which corresponds to U.S. Appl. No. 12/042,318, 4 pages (Beaver).
Certificate of Examination dated May 7, 2012, received in Australian Patent Application No. 2011101154 which corresponds to U.S. Appl. No. 12/042,318, 1 page (Beaver).
Office Action dated Dec. 13, 2011, received in Australian Patent Application No. 2011101157, which corresponds to U.S. Appl. No. 12/042,318, 4 pages (Beaver).
Certificate of Examination dated May 8, 2012, received in Australian Patent No. 2011101157, which corresponds to U.S. Appl. No. 12/042,318, 1 page (Beaver).
Office Action dated Dec. 13, 2011, received in Australian Patent Application No. 2011101156, which corresponds to U.S. Appl. No. 12/042,318, 3 pages (Beaver).
Certificate of Examination dated May 8, 2012: received in Australian Patent No. 2011101156, which corresponds to U.S. Appl. No. 12/042,318, 1 page (Beaver).

(56) References Cited

OTHER PUBLICATIONS

Office Action dated Dec. 13, 2011, received in Australian Patent Application No. 2011101155, which corresponds to U.S. Appl. No. 12/042,318, 3 pages (Beaver).
Certificate of Examination dated May 8, 2012, received in Australian Patent No. 2011101155, which corresponds to U.S. Appl. No. 12/042,318, 1 page (Beaver).
Office Action dated Sep. 3, 2012, received in Australian Patent Application No. 2011265335, which corresponds to U.S. Appl. No. 12/042,318, 2 pages (Beaver).
Notice of Acceptance dated Nov. 8, 2012, received in Australian Patent Application No. 2011265335, which corresponds to U.S. Appl. No. 12/042,318, 3 pages (Beaver).
Grant for Invention Patent dated Mar. 22, 2011, received in Chinese Patent Application No. ZL200910118596.4, which corresponds to U.S. Appl. No. 12/042,318, 3 pages (Beaver).
Office Action dated Jan. 21, 2013, received in Chinese Patent Application No. 201110148738.9, which corresponds to U.S. Appl. No. 12/042,318, 17 pages (Beaver).
Office Action dated Mar. 2, 2011, received in European Patent Application No. 11150786.9, which corresponds to U.S. Appl. No. 12/042,318, 5 pages (Beaver).
Decision to Grant dated Jul. 26, 2012, received in European Patent Application No. 11150786.9, which corresponds to U.S. Appl. No. 12/042,318, 1 pages (Beaver).
Certificate of Grant dated Nov. 30, 2012, received in Hong Kong Patent Application No. 11110416.2, which corresponds to U.S. Appl. No. 12/042,318, 1 page (Beaver).
Office Action dated Aug. 26, 2011, received in Japanese Patent Application No. 2009-080377, which corresponds to U.S. Appl. No. 12/042,318, 2 pages (Beaver).
Decision to Grant dated Jul. 27, 2012, received in Japanese Patent Application No. 2009080377, which corresponds to U.S. Appl. No. 12/042,318, 4 pages (Beaver).
Office Action dated Jan. 18, 2011, received in U.S. Appl. No. 12/042,067, 14 pages (Williamson).
Final Office Action dated Jul. 28, 2011, received in U.S. Appl. No. 12/042,067, 18 pages (Williamson).
Office Action dated Oct. 19, 2011, received in Chinese Patent Application No. 200980000014.0, which corresponds to U.S. Appl. No. 12/042,067, 15 pages (Williamson).
Office Action dated Jun. 13, 2012, received in Chinese Patent Application No. 200980000014.0, which corresponds to U.S. Appl. No. 12/042,067, 6 pages (Williamson).
Decision to Grant dated Nov. 27, 2012, received in Chinese Patent Application No. 200980000014.0, which corresponds to U.S. Appl. No. 12/042,067, 1 page (Williamson).
Office Action dated Oct. 19, 2010, received in German Patent Application No. 11 2009 000 001.0, which corresponds to U.S. Appl. No. 12/042,067, 5 pages (Williamson).
Office Action dated Sep. 26, 2012, received in German Patent Application No. 11 2009 000 001.0, which corresponds to U.S. Appl. No. 12/042,067, 5 pages (Williamson).
Office Action dated Oct. 15, 2010, received in European Patent Application No. 09 700 006.1, which corresponds to U.S. Appl. No. 12/042,067, 4 pages (Williamson).
Office Action dated Oct. 24, 2011, received in Japanese Patent Application No. 2010-502356, which corresponds to U.S. Appl. No. 12/042,067, 2 pages (Williamson).
Office Action dated Jan. 4, 2011, received in U.S. Appl. No. 12/042,299, 9 pages (Williamson).
Final Office Action dated Jul. 8, 2011, received in U.S. Appl. No. 12/042,299, 13 pages (Williamson).
Office Office Action dated May 3, 2012, received in U.S. Appl. No. 12/042,299, 14 pages (Williamson).
Notice of Allowance dated Dec. 12, 2012, received in U.S. Appl. No. 12/042,299, 2 pages (Williamson).
Office Action dated Oct. 26, 2011, received in Chinese Patent Application No. 200980000013.6, which corresponds to U.S. Appl. No. 12/042,299, 11 pages (Williamson).

Office Action dated Jun. 6, 2012, received in Chinese Patent Application No. 200980000013.6, which corresponds to U.S. Appl. No. 12/042,299, 7 pages (Williamson).
Office Action dated Dec. 5, 2012, received in Chinese Patent Application No. 200980000013.6, which corresponds to U.S. Appl. No. 12/042,299, 7 pages (Williamson).
Office Action dated August 10, 2010, received in German Patent Application No. 11 2009 000 003.7, which corresponds to U.S. Appl. No. 12/042,299, 3 pages (Williamson).
Office Action dated Sep. 26, 2012, received in German Patent Application No. 11 2009 000 003.7, which corresponds to U.S. Appl. No. 12/042,299, 5 pages (Williamson).
Office Action dated Nov. 26, 2010, received in European Patent Application No. 09 700 007.9, which corresponds to U.S. Appl. No. 12/402,299, 5 pages (Williamson).
Office Action dated Sep. 12, 2012, received in European Patent Application No. 11184226.6, which corresponds to U.S. Appl. No. 12/402,299 5 pages (Williamson).
Office Action dated Sep. 12, 2012, received in European Patent Application No. 11184224.1, which corresponds to U.S. Appl. No. 12/402,299, 4 pages (Williamson).
Office Action dated Sep. 12, 2012, received in European Patent Application No. 11184223.3, which corresponds to U.S. Appl. No. 12/402,299, 4 pages (Williamson).
Office Action dated Sep. 12, 2012, received in European Patent Application No. 11184222.5, which corresponds to U.S. Appl. No. 12/402,299, 4 pages (Williamson).
Office Action dated Aug. 15, 2011, received in Japanese Patent Application No. 2010 502358, wnich corresponds to U.S. Appl. No. 12/042,299, 2 pages (Williamson).
Decision to Grant dated Mar. 23, 2012, received in Japanese Patent Application No. 2010-502358, which corresponds to U.S. Appl. No. 12/042,299, 5 pages (Williamson).
Office Action dated Jan. 3, 2013, received in U.S. Appl. No. 13/077,931, 24 pages (Shaffer).
Office Action dated Nov. 21, 2012, received in U.S. Appl. No. 13/163,624, 29 pages (Williamson).
Office Action dated Nov. 26, 2012, received in U.S. Appl. No. 13/163,626, 29 pages (Williamson).
Office Action dated Sep. 14, 2011, received in U.S. Appl. No. 12/042,237, 8 pages (Bolsinga).
Notice of Allowance dated Mar. 6, 2012, received in U.S. Appl. No. 12/042,237, 16 pages (Bolsinga).
Office Action dated Jul. 14, 2011, received in Chinese Patent Application No. 200980000015.5, which corresponds to U.S. Appl. No. 12/042,237, 8 pages (Bolsinga).
Office Action dated Feb. 22, 2012, received in Chinese Patent Application No. 200980000015.5, which corresponds to U.S. Appl. No. 12/042,237, 9 pages (Bolsinga).
Office Action dated Sep. 11, 2012, received in Chinese Patent Application No. 200980000015.5, which corresponds to U.S. Appl. No. 12/042,237, 9 pages (Bolsinga).
Office Action dated Sep. 26, 2012, received in German Patent Application No. 11 2009 000 002.9, which corresponds to U.S. Appl. No. 12/042,237, 5 pages (Bolsinga).
Office Action dated Jan. 16, 2012, received in Japanese Patent Application No. 2010-502357, which corresponds to U.S. Appl. No. 12/042,237, 2 pages (Bolsinga).
Notice of Allowance dated May 23, 2012, received in U.S. Appl. No. 13/221,830, 8 pages (Moore).
Notice of Allowance dated Dec. 3, 2012, received in U.S. Appl. No. 13/221,830, 17 pages (Moore).
Office Action dated Nov. 11, 2010, received in Chinese Patent Application No. 200880001827.7, which corresponds to U.S. Appl. No. 11/620,717, 6 pages (Platzer).
Office Acton dated Jan. 29, 2012, received in Chinese Patent Application No. 2008800018227, which corresponds to U.S. Appl. No. 11/620,717, 5 pages (Platzer).
Office Action dated Jun. 20, 2012, received in U.S. Appl. No. 12/869,182, 18 pages (Platzer).
Notice of Allowance dated Dec. 12, 2012, received in U.S. Appl. No. 12/869,182, 8 pages (Platzer).

(56) References Cited

OTHER PUBLICATIONS

Final Office Action dated Mar. 12, 2012, received in U.S. Appl. No. 11/620,727, 21 pages (Blumenberg).
Office Action dated Aug. 15, 2012, received in U.S. Appl. No. 11/620,727, 19 pages (Blumenberg).
Office Action dated Nov. 5, 2012, received in U.S. Appl. No. 13/221,836, 31 pages (Blumenberg).
Office Action dated Jul. 24, 2012, received in U.S. Appl. No. 13/221,837, 25 pages (Blumenberg).
Final Office Action dated Feb. 14, 2013, received in U.S. Appl. No. 13/221,837, 17 (Blumenberg).
Final Office Action dated Jul. 9, 2012, received in U.S. Appl. No. 13/251,121, 30 pages (Blumenberg).
Final Office Action dated Jun. 20, 2012, received in U.S. Appl. No. 13/251,146, 28 pages (Blumenberg).
Final Office Action dated Jul. 5, 2012, received in U.S. Appl. No. 13/251,150, 36 pages (Blumenberg).
Final Office Action dated Jun. 20, 2012, received in U.S. Appl. No. 13/251,152, 24 pages (Blumenberg).
Office Action dated Aug. 29, 2012, received in U.S. Appl. No. 11/620,715, 20 pages (Platzer).
Final Office Action dated Mar. 1, 2013, received in U.S. Appl. No. 11/620,715, 25 pages (Platzer).
Office Action dated Jun. 6, 2012, received in Chinese Patent Application No. 200880001855.9, which corresponds to U.S. Appl. No. 11/620,715, (Platzer).
Office Action dated Nov. 5, 2012, received in Chinese Patent Application No. 200880001855.9, which corresponds to U.S. Appl. No. 11/620,715, 22 pages (Platzer).
Office Action dated Oct. 30, 2012, received in European Patent Application No. 08 712 946.6, which corresponds to U.S. Appl. No. 11/620,715. 20 pages (Platzer).
Office Action dated Jun. 18, 2012, received in U.S. Appl. No. 13/464,800, 10 pages (Bolsinga).
Notice of Allowance dated Nov. 13, 2012, received in U.S. Appl. No. 13/464,800, 20 pages (Bolsinga).
Notice of Allowance dated Dec. 19, 2012, received in U.S. Appl. No. 13/464,800, 11 pages (Bolsinga).
Office Action dated Mar. 5, 2013, received in U.S. Appl. No. 13/670,378, 40 pages (Beaver).
Office Action dated Apr. 1, 2009, received in U.S. Appl. No. 11/620,709 (Platzer).
Final Office Action dated Nov. 13, 2009, received in U.S. Appl. No. 11/620,709 (Platzer).
Office Action dated Jun. 9, 2010, received in U.S. Appl. No. 11/620,709, 8 pages (Platzer).
Office Action Jul. 8, 2009, received in U.S. Appl. No. 11/620,717 (Platzer).
Office Action dated Dec. 29, 2009, received in U.S. Appl. No. 11/620,717 (Platzer).
Notice of Allowance dated Jul. 20, 2010, received in U.S. Appl. No. 11/620,717, 31 pages (Platzer).
Office Action dated Apr. 1, 2009, received in U.S. Appl. No. 11/620,723 (Platzer).
Final Office Action dated Nov. 17, 2009, received in U.S. Appl. No. 11/620,723 (Platzer).
Office Action dated Jun. 8, 2010, received in U.S. Appl. No. 11/620,723, 8 pages (Platzer).
Brown et al., "Distributed active objects," Computer Networks and ISDN Systems, North Holland Publishing, Amsterdam, NL, vol. 28, No. 11, May 1996, pp. 1037-1052.
W3C, "Document Object Model (DOM) Level 2 Events Specification, Version 1," W3C Recommendation, Nov. 13, 2000, 48 pages.
Wikibooks, "Java Programming/Applets/Event Listeners," May 1, 2007, http://en.wikibooks.org/w/index.php?title=Java_Programming/Applets/Event_Listeners&oldid=849558, 6 pages.
International Preliminary Report on Patentability dated Dec. 27, 2012, received in International Patent Application No. PCT/US2011/039583, which corresponds to U.S. Appl. No. 12/892,848, 10 pages (Dale).

European Search Report dated Feb. 28, 2013, received in European Patent Application No. 12188748.3, which corresponds to U.S. Appl. No. 12/042,067, 8 pages (Williamson).
Office Action dated Mar. 14, 2013, received in U.S. Appl. No. 12/042,067, 27 pages (Williamson).
Summons to oral proceedings dated Mar. 7, 2013, received in European Patent Application No. 09700006.1, which corresponds to U.S. Appl. No. 12/042,067, 5 pages (Williamson).
Office Action dated Mar. 22, 2013, received in U.S. Appl. No. 13/163,624, 11 pages (Williamson).
Office Action dated Mar. 20, 2013, received in U.S. Appl. No. 13/163,626, 10 pages (Williamson).
Summons to oral proceedings dated Mar. 27, 2013, received in European Patent Application No. 09700008.7, which corresponds to U.S. Appl. No. 12/042,237, 4 pages (Bolsinga).
Final Office Action dated Mar. 7, 2013, received in U.S. Appl. No. 11/620,727, 23 pages (Blumenberg).
Office Action dated Apr. 11, 2013, received in U.S. Appl. No. 13/251,146, 35 pages (Blumenberg).
Office Action dated Mar. 7, 2013, received in Chinese Patent Application No. 200880001855.9, which corresponds to U.S. Appl. No. 11/620,715, 21 pages (Platzer).
Office Action, dated Jul. 1, 2015, received in European Patent Application No. 10 712 825.8, which corresponds with U.S. Appl. No. 12/566,660, 6 pages.
Office Action, dated Jul. 1, 2015, received in U.S. Appl. No. 12/789,695, 14 pages.
Plaisant, 1991 Video of the HCIL Touchscreen Toggle Sewitches, video recorded Jan. 1991, uploaded to YouTube Nov. 30, 2011, 6:39 minutes, 2 pages, www.youtube.com/watch?v=wFWbdxicvK0.
*Apple Inc.* v. *HTC Corporation*, Brief Details of Claim, In the High Court of Justice, Chancery Division, Patents Court, Sep. 12, 2011, 2 pgs.
*Apple Inc.* v. *HTC Corporation*, Particulars of Claim, In the High Court of Justice, Chancery Division, Patents Court, Sep. 12, 2011, 4 pgs.
*Apple Inc.* v. *HTC Corporation*, Particulars of Infringement, In the High Court of Justice, Chancery Division, Patents Court, Sep. 12, 2011, 5 pgs.
*Apple Inc.* vs. *Samsung Electronics Co. Ltd. et al.*, Judgment. Aug. 24, 2011, 65 pgs.
*Apple Inc.* vs. *Samsung Electronics Co. Ltd., et al.*, Samsung's Motion to Supplement Invalidity Contentions together with Exhibit 6, Jan. 27, 2012, 47 pgs.
*Apple Inc.* vs. *Samsung Electronics Co. Ltd., et al.*, Samsung's Patent Local Rule 3-3 and 3-4 Disclosures together with Exhibits G-1 through G-7 and Exhibit H, Oct. 7, 2011, 287 pgs.
Apple Inc., Proprietor's Response to Addendum from Samsug Electronics GmbH, Jun. 21, 2012, 3 pgs.
Apple Inc., Proprietor's Response to Communication under Rule 79(1) EPC, Mar. 8, 2012, 8 pgs.
Apple Inc., Proprietor's Response to Notice of Intervention from Motorola Mobility Germany GmbH, Jun. 21, 2012, 3 pgs.
Ballard, Microsoft Makes Research Technologies Available for Licensing, May 5, 2005, 8 pgs, theserveside.com/discussions/thread.tss?thread_id=33761.
Bederson, Photo Mesa 3.1.2, Screen Shots, 2006, 5 pgs.
Benko, Precise Selection Techniques for Multi-Touch Screens, CHI 2006, Apr. 22-27, 2006, 10 pgs.
Certificate of Grant, AU Application 2012100050, Mar. 2, 2012, 3 pgs.
Certificate of Grant, HK Application 10103983.1, Feb. 3, 2012, 5 pgs.
Certificate of Grant, TR part of EP Patent 2126678, Jun. 21, 2012, 3 pgs.
Davis, Flash to the Core—An Interactive Sketchbook, praystation.com. 2002, 3 pgs, flashtothecore.praystation.com/.
Decision revoking the European Patent, EP Patent 2098948, Apr. 2, 2014, 28 pgs.
Decision to Grant, CN Application 201080020598.0, Apr. 24, 2014, 1 page.
Decision to Grant, CN Application 201110063183.8, Feb. 24, 2014, 4 pgs.
Decision to Grant, EP Application 08713567.9, Oct. 7, 2011, 1 page.

(56) References Cited

OTHER PUBLICATIONS

Decision to Grant, JP Application 2009-544996, May 20, 2011, 1 page.
Decision to Grant, JP Application 2010-157302, Oct. 26, 2012, 4 pgs.
Decision to Grant, JP Application 2010-157303, Apr. 15, 2013, 4 pgs.
Decision to Grant, JP Application 2010-502357, Mar. 28, 2014, 1 pg.
Decision to Grant, JP Application 2012-088747, Feb. 16, 2015, 3 pgs.
Decision to Grant, JP Application 2012-218235, Sep. 22, 2014, 3 pgs.
Decision to Refuse EP Application, EP Application 09700006.1, Jul. 15, 2013, 15 pgs.
Decision to Refuse EP Application, EP Application 09700008.7, Oct. 8, 2013, 18 pgs.
Decision to refuse EP application, EP Application 11184222.5, Feb. 11, 2015, 10 pgs.
Decision to refuse EP application, EP Application 11184223.3, Feb. 11, 2015, 10 pgs.
Decision to Refuse EP Application, EP Application 11184224.1, Feb. 11, 2015, 10 pgs.
Decision to refuse EP application, EP Application 12188748.3, Dec. 12, 2014, 14 pgs.
Dewid, Scroll Control Box, IBM Technical Disclosure Bulletin, vol. 38, 04, Apr. 1993, pp. 399-403.
Dietz, DiamondTouch: A Multi-User Touch Technology, UIST'01, Orlando, FL, 2001, 17 pgs.
Dodge, Microsoft Office Excel 2003 Office Manual, Microsoft Press, Jul. 12, 2004, vol. 1, p. 66-68.
Esenther, Fluid DTMouse: Better Mouse Support for Touch-Based Interactions, May 2006, 6 pgs.
European Search Report, EP Application 11150788.5, Mar. 1, 2011, 6 pgs.
European Search Report, EP Application 11152015.1, May 20, 2011, 9 pgs.
European Search Report, EP Application 11182954.5, Nov. 29, 2011, 6 pgs.
European Search Report, EP Application 11182959.4, Nov. 30, 2011, 7 pgs.
European Search Report, EP Application 11182962.8, Dec. 1, 2011, 8 pgs.
European Search Report, EP Application 11182963.6, Dec. 1, 2011, 8 pgs.
European Search Report, EP Application 11184222.5, Jan. 13, 2012, 7 pgs.
European Search Report, EP Application 11184223.3, Jan. 13, 2012, 7 pgs.
European Search Report, EP Application 12156394.4, Jun. 5, 2012, 6 pgs.
Examiner's Amendment, U.S. Appl. No. 11/956,969, Oct. 29, 2008, 6 pgs.
Examiner's Answer, U.S. Appl. No. 11/620,715, Feb. 13, 2014, 22 pgs.
Examiner's Answer, U.S. Appl. No. 11/620,727, Feb. 13, 2014, 23 pgs.
Examiner's Answer, U.S. Appl. No. 13/221,837, Feb. 11, 2014, 19 pgs.
Examiner's Answer, U.S. Appl. No. 13/251,121, Apr. 29, 2014, 41 pgs.
Examiner's Answer, U.S. Appl. No. 13/251,146, May 7, 2014, 43 pgs.
Examiner's Answer, U.S. Appl. No. 13/251,150, Jun. 17, 2014, 47 pgs.
Examiner's Answer, U.S. Appl. No. 13/251,152, May 21, 2014, 45 pgs.
Final Office Action, U.S. Appl. No. 11/620,720, Jun. 23, 2009, 17 pgs.
Final Office Action, U.S. Appl. No. 12/042,237, Jun. 2, 2011, 9 pgs.
Final Office Action, U.S. Appl. No. 12/270,815, Feb. 14, 2013, 13 pgs.
Final Office Action, U.S. Appl. No. 12/789,695, May 7, 2014, 17 pgs.
Final Office Action, U.S. Appl. No. 13/084,472, Jun. 17, 2014, 31 pgs.
Final Office Action, U.S. Appl. No. 13/221,836, May 15, 2013, 22 pgs.
Final Office Action, U.S. Appl. No. 13/221,836, May 20, 2014, 36 pgs.
Forlines, DTLens: Multi-user Tabletop Spatial Data Exploration, UIST'05, Oct. 2005, Seattle, WA, 6 pgs.
Forlines, Glimpse: A Novel Input Model for Multi-Level Devices, CHI 2005, Apr. 2-7, 2005, Portland, OR, 6 pgs.
Hildon User Interface Style Guide Summary, Version 1.1, 2005, 15 pgs.
HTC Corporation, Intervention of the Assumed Infringer According to Art. 105 EPC, EP Patent 2098948, Dec. 12, 2011, 24 pgs.
HTC Europe Co. Ltd and Apple Inc. Invalidity Claim together with amended Particulars of Claim and amended Grounds of Invalidity, Jul. 29, 2011, 22 pgs.
HTC Europe Co. Ltd and Apple Inc. Invalidity Claim together with annexes, Apr. 5, 2012, 84 pgs.
International Preliminary Report on Patentability, PCT Application PCT/US2005/000089, Jun. 18, 2005, 5 pgs.
International Preliminary Report on Patentability, PCT Application PCT/US2009/034772, Sep. 7, 2010, 7 pgs.
International Preliminary Report on Patentability, PCT Application PCT/US2009/035858, Sep. 7, 2010, 6 pgs.
International Preliminary Report on Patentability, PCT Application PCT/US2011/022516, Aug. 9, 2012, 11 pgs.
International Search Report and Written Opinion, PCT Application PCT/US2005/000089, May 31, 2005, 7 pgs.
International Search Report and Written Opinion, PCT Application PCT/US2008/050292, Sep. 19, 2008, 25 pgs.
International Search Report and Written Opinion, PCT Application PCT/US2009/035858, Jul. 3, 2009, 10 pgs.
Invitation to Pay Additional Fees, PCT Application PCT/US2008/050292, Jul. 18, 2008, 4 pgs.
Karlson, AppLens and LaunchTile: Two Designs for One-handed Thumb Use on Small Devices, PowerPoint presentation, CHI 2005 Apr. 2-7, 2005, Portland, OR, 17 pgs.
Karlson, AppLens and LaunchTile: Two Designs for One-handed Thumb Use on Small Devices, CHI 2005 Apr. 2-7, 2005, Portland, OR, 10 pgs.
Kim, HCI (Human Computer Interaction) Using Multi-touch Tabletop Display, IEEE Pacific Rim Conference on Communications, Computers and Signal Processing, Aug. 22-24, 2007, pp. 391-394.
Lin, A Embedded GUI Based on Linux OS and Ameliorate of Framework, May 13, 2004, 3 pgs.
Maemo Coding Style and Programming Guidelines (Maemo 3.x), 2007, 5 pgs.
Matsuda, The Latest Trend of VRML, Cyber Passage, Bit, Japan, Kyoritsu Shuppan Co Ltd, vol. 28, No. 8, Aug. 1, 1996, pp. 57-61 and 64-65.
Merriam-Webster definition of "Contemporaneous", Jan. 21, 2014, 2 pgs.
Mertz, The influence of design techniques on user interfaces: the DigiStrips experiment for air traffic control, Proceeding of HCI-Aero 2000 International Conference on Human-Computer Interaction in Aeronautics, Toulouse, France, 6 pgs.
Microsoft Word 2003 Screen Shots, Microsoft 2003, 2 pgs.
Miller, Personal/Java Application Environment, Jun. 8, 1999, 12 pgs, java.sun.com/products/personaljava/touchable/.
Millhollon, Microsoft Office Word 2003 Inside Out, 2003, Microsoft Press, Redmond, Washington, 7 pgs.
Motorola Mobility Opposition Grounds to Apple Inc. EP Patent 2126678, Apr. 11, 2012, together with Exhibits E3, E4, and E5 re: CHI 2005, Apr. 2-7, 2005, Portland, OR, 53 pgs.
Notice of Acceptance, AU Application 2009208099, Nov. 24, 2011, 3 pgs.
Notice of Acceptance, AU Application 2009208103, Apr. 14, 2011, 3 pgs.
Notice of Acceptance, AU Application 2011201639, Nov. 9, 2011, 3 pgs.
Notice of Acceptance, AU Application 2011209720, May 1, 2014, 3 pgs.
Notice of Allowance, CA Application 2,658,177, Jan. 30, 2012, 1 page.

(56) References Cited

OTHER PUBLICATIONS

Notice of Allowance, CA Application 2,817,648, Apr. 10, 2014, 1 page.
Notice of Allowance, CA Application 2653363, Apr. 29, 2014, 1 pg.
Notice of Allowance, JP Application 2012-500844, Aug. 1, 2014, 3 pgs.
Notice of Allowance, JP Application 2013-515382, Aug. 22, 2014, 3 pgs.
Notice of Allowance, KR 2009-7007114, Apr. 26, 2013, 2 pgs.
Notice of Allowance, KR Application 2012-7022239, Mar. 30, 2015, 2 pgs (KR version only).
Notice of Allowance, U.S. Appl. No. 11/956,969, Oct. 29, 2008, 5 pgs.
Notice of Allowance, U.S. Appl. No. 12/270,805, May 17, 2012, 26 pgs.
Notice of Allowance, U.S. Appl. No. 12/270,807, May 11, 2012, 16 pgs.
Notice of Allowance, U.S. Appl. No. 12/270,810, Jul. 11, 2012, 17 pgs.
Notice of Allowance, U.S. Appl. No. 12/270,812, Sep. 19, 2012, 25 pgs.
Notice of Allowance, U.S. Appl. No. 12/869,182, Feb. 23, 2012, 5 pgs.
Notice of Allowance, U.S. Appl. No. 13/077,931, Dec. 31, 2014, 8 pgs.
Notice of Allowance, U.S. Appl. No. 13/163,624, May 12, 2014, 5 pgs.
Notice of Allowance, U.S. Appl. No. 13/163,626, Mar. 31, 2014, 5 pgs.
Notice of Allowance, U.S. Appl. No. 13/867,950, Nov. 15, 2013, 7 pgs.
Notice of Allowance, dated May 28, 2015, received in U.S. Appl. No. 14/180,267, 10 pages.
Notice of Appeal in Expedited Appeal in Summary Proceedings, Sep. 11, 2011, 51 pgs.
Notice of Opposition, EP Patent 2098948, Nov. 8, 2011, 22 pgs.
Office Action, AU Application 2008100283, Jul. 1, 2008, 2 pgs.
Office Action, AU Application 2008201540, Jul. 15, 2009, 2 pgs.
Office Action, AU Application 2008201540, Feb. 19, 2009, 2 pgs.
Office Action, AU Application 2009200366, Feb. 11, 2009, 4 pgs.
Office Action, AU Application 2009200493, Dec. 13, 2011, 3 pgs.
Office Action, AU Application 2009200493, Mar. 17, 2010, 2 pgs.
Office Action, AU Application 2009208103, Apr. 8, 2010, 2 pgs.
Office Action, AU Application 2011349513, Dec. 10, 2014, 3 pgs.
Office Action, AU Application 2012200689, Sep. 9, 2013, 3 pgs.
Office Action, CA Application 2,653,363, Sep. 3, 2013, 3 pgs.
Office Action, CA Application 2,653,363, Jan. 18, 2012, 2 pgs.
Office Action, CA Application 2,658,177, Dec. 1, 2009, 2 pgs.
Office Action, CA Application 2,658,177, Jun. 22, 2011, 2 pgs.
Office Action, CA Application 2,759,090, Nov. 4, 2013, 3 pgs.
Office Action, CA Application 2,759,091, Nov. 7, 2013, 4 pgs.
Office Action, CA Application 2,817,890, Oct. 9, 2013, 3 pgs.
Office Action, CA Application 2,817,890, Apr. 22, 2014, 3 pgs.
Office Action, CN 200880001811.6, Jan. 6, 2012, 10 pgs.
Office Action, CN 200880001811.6, Aug. 10, 2011, 7 pgs.
Office Action, CN 200880001811.6, Oct. 21, 2010, 5 pgs.
Office Action, CN 201210128932.5, Oct. 30, 2014, 3 pgs.
Office Action, CN Application 200880000019.9, Jan. 5, 2012, 14 pgs.
Office Action, CN Application 200880000019.9, Feb. 18, 2013, 12 pgs.
Office Action, CN Application 200880000019.9, Sep. 20, 2012, 22 pgs.
Office Action, CN Application 200880000019.9, Jul. 23, 2013, 7 pgs.
Office Action, CN Application 200880000019.9, Nov. 23, 2010, 13 pgs.
Office Action, CN Application 200880001855.9, Jul. 21, 2011, 19 pgs.
Office Action, CN Application 200880001855.9, Dec. 23, 2011, 26 pgs.
Office Action, CN Application 200880001855.9, Jul. 29, 2014, 5 pgs.
Office Action, CN Application 200910118596.4, Aug. 6, 2010, 6 pgs.
Office Action, CN Application 200980000015.5, Jan. 15, 2015, 1 pg.
Office Action, CN Application 200980000015.5, May 29, 2014, 1 pg.
Office Action, CN Application 201110148738.9, Jun. 5, 2014, 3 pgs.
Office Action, CN Application 201110148738.9, Feb. 8, 2014, 3 pgs.
Office Action, CN Application 201110463262.8, Apr. 30, 2014, 3 pgs.
Office Action, CN Application 201180022994.1, Dec. 3, 2014, 4 pgs.
Office Action, CN Application 201210128911.3, Nov. 15, 2014, 3 pgs.
Office Action, CN Application 201210128911.3, Jan. 17, 2014, 3 pgs.
Office Action, CN Application 201210128915.1, Mar. 18, 2014, 3 pgs.
Office Action, CN Application 201210128915.1, Dec. 24, 2014, 3 pgs.
Office Action, CN Application 201210128932.5, Feb. 21, 2014, 3 pgs.
Office Action, DE Application 102009011687.7, May 17, 2010, 5 pgs.
Office Action, DE Application 112008000144.8, Oct. 29, 2010, 8 pgs.
Office Action, DE Application 112009000002.9, Oct. 19, 2010, 4 pgs.
Office Action, EP Application 08705471.4, Dec. 19, 2011, 6 pgs.
Office Action, EP Application 08705471.4, Jan. 29, 2015, 6 pgs.
Office Action, EP Application 08712946.6, Oct. 20, 2014, 6 pgs.
Office Action, EP Application 08712964.9, Jan. 20, 2015, 8 pgs.
Office Action, EP Application 08713567.9, Dec. 29, 2009, 5 pgs.
Office Action, EP Application 09154313.2, Feb. 12, 2010, 4 pgs.
Office Action, EP Application 09700007.9, Mar. 9, 2012, 7 pgs.
Office Action, EP Application 09700007.9, Aug. 28, 2014, 8 pgs.
Office Action, EP Application 09700008.7, Jul. 12, 2010, 4 pgs.
Office Action, EP Application 11150788.5, May 9, 2014, 6 pgs.
Office Action, EP Application 11184167.2, May 14, 2014, 6 pgs.
Office Action, EP Application 11184169.8, May 14, 2014, 6 pgs.
Office Action, EP Application 11184170.6, May 16, 2014, 6 pgs.
Office Action, EP Application 11184172.2, May 16, 2014, 5 pgs.
Office Action, EP Application 11184186.2, Mar. 20, 2014, 5 pgs.
Office Action, EP Application 11184409.8, May 16, 2014, 6 pgs.
Office Action, EP Application 11808779.0, Jul. 1, 2014, 5 pgs.
Office Action, EP Application 12156394.4, Oct. 22, 2014, 6 pgs.
Office Action, EP Application 12156395.1, Oct. 22, 2014, 6 pgs.
Office Action, EP Application 12188748.3, Oct. 30, 2013, 5 pgs.
Office Action, JP Application 2009-544996, Nov. 8, 2010, 1 pgs.
Office Action, JP Application 2009-544996, Feb. 12, 2010, 1 page.
Office Action, JP Application 2010-157303, Oct. 15, 2012, 1 pgs.
Office Action, JP Application 2010-502357, Mar. 4, 2013, 2 pgs.
Office Action, JP Application 2012-088747, Aug. 11, 2014, 3 pgs.
Office Action, JP Application 2012-224838, Jan. 6, 2014, 2 pgs.
Office Action, JP Application 2012-500844, Feb. 14, 2014, 6 pgs.
Office Action, JP Application 2013-546284, Jul. 11, 2014, 3 pgs (JP only).
Office Action, KR Application 2009-7003574, Aug. 27, 2009, 1 page.
Office Action, KR Application 2012-7022239, Apr. 30, 2014, 2 pgs.
Office Action, KR Application 2013-7000337, Jun. 25, 2013, 7 pgs.
Office Action, KR Application 2013-7019463, Jun. 26, 2014, 2 pgs.
Office Action, TW Application 100147539, Apr. 8, 2014, 5 pgs.
Office Action, U.S. Appl. No. 11/620,710, Jul. 21, 2010, 29 pgs.
Office Action, U.S. Appl. No. 11/620,720, Nov. 18, 2009, 17 pgs.
Office Action, U.S. Appl. No. 11/620,720, Dec. 23, 2008, 18 pgs.
Office Action, U.S. Appl. No. 11/620,727, Nov. 4, 2011, 15 pgs.
Office Action, U.S. Appl. No. 12/042,067, Mar. 14, 2013, 14 pgs.
Office Action, U.S. Appl. No. 12/042,237, Dec. 30, 2010, 9 pgs.
Office Action, U.S. Appl. No. 12/207,429, Mar. 30, 2012, 10 pgs.
Office Action, U.S. Appl. No. 12/270,805, Oct. 11, 2011, 33 pgs.
Office Action, U.S. Appl. No. 12/270,807, Oct. 11, 2011, 32 pgs.
Office Action, U.S. Appl. No. 12/270,810, Oct. 12, 2011, 18 pgs.
Office Action, U.S. Appl. No. 12/270,812, Oct. 13, 2011, 18 pgs.
Office Action, U.S. Appl. No. 12/270,812, May 17, 2012, 18 pgs.
Office Action, U.S. Appl. No. 12/270,815, Oct. 11, 2011, 18 pgs.
Office Action, U.S. Appl. No. 12/270,815, May 17, 2012, 17 pgs.

(56) References Cited

OTHER PUBLICATIONS

Office Action, U.S. Appl. No. 12/869,182, Oct. 24, 2011, 6 pgs.
Office Action, U.S. Appl. No. 12/892,851, May 22, 2014, 11 pgs.
Office Action, U.S. Appl. No. 13/077,931, Jul. 27, 2014, 21 pgs.
Office Action, U.S. Appl. No. 13/084,472, Dec. 6, 2013, 23 pgs.
Office Action, U.S. Appl. No. 13/084,472, Dec. 10, 2010, 24 pgs.
Office Action, U.S. Appl. No. 13/221,827, Jun. 23, 2014, 19 pgs.
Office Action, U.S. Appl. No. 13/251,121, May 1, 2013, 17 pgs.
Office Action, U.S. Appl. No. 13/251,121, Jan. 10, 2012, 16 pgs.
Office Action, U.S. Appl. No. 13/251,146, Jan. 31, 2012, 16 pgs.
Office Action, U.S. Appl. No. 13/251,150, Feb. 10, 2012, 23 pgs.
Office Action, U.S. Appl. No. 13/251,152, Jan. 20, 2012, 20 pgs.
Office Action, U.S. Appl. No. 14/189,922, Sep. 24, 2014, 6 pgs.
Office Action, dated May 20, 2015, received in U.S. Appl. No. 13/221,827, 26 pages.
Olsen, Building Interactive Systems, Chapter 3, Jan. 2009, 6 pgs.
Olsen, Developing User Interfaces, Morgan Kaufmann Publishers, 1998, chapter 4, 5 pgs.
Plaisant, Touchscreen Toggle Design, Proceedings of the Conference on Human Factors in Computing Systems, Addison Wesley, US, May 3, 1992, 2 pgs.
Pleading notes Mr B.J. Berghuis van Woortman, Aug. 10-11, 2010, 16 pgs.
Pleading notes Mr Kleemans, Mr Blomme and Mr Van Oorschot, Aug. 10, 2011, 35 pgs.
Quinn Emanuel, Response to Patent Proprietor's Grounds of Appeal, Dec. 8, 2014, 34 pgs.
Quinn Emanuel, Statement re Notice of the Opposition Division dated May 15, 2013, Dec. 3, 2013, 13 pgs.
Quinn Emanuel, Statement, Jan. 21, 2014, 9 pgs.
Ramachandran, An Architecture for Ink Annotations on Web Documents, Proceedings of the 7th International Conference on Document Analysis and Recognition, Aug. 2003, pp. 256-260.
Rappin, wxPython in Action, 2006, 40 pgs.
Rowan, Breakthrough Internet Device, Eureka Man, available online at https://web.archive.org/web/20070709083626/http:/leurekaman.com/towards-multti-touch-in-the-browser, Jan. 31, 2007, 2 pgs.
Rubine, The Automatic Recognition of Gestures, 1991 Dean Harris Rubine, in partial fulfillment of the requirements for the degree of Doctor of Philosophy in Computer Science, Carnegie Mellon University, 285 pgs.
Salmoni, The Zooming User Interface, Advogato, Aug. 16, 2004, 14 pgs, www.advogato.org/article/788.html.
Samsung Electronics GmbH/Apple Inc. Opposition, Jan. 30, 2012, 27 pgs.
Samsung Electronics GMmbH, Supplement to Notice of Opposition, Apr. 5, 2011, 6 pgs.
Samsung Statement of Defence (Smartphones) Also Counterclaim, Jul. 20, 2011, 48 pgs.
Samsung Statement of Defence (Tablets) Also Counterclaim, Jul. 20, 2011, 44 pgs.
Sells, Windows Forms Programming in C#, 2004, 9 pgs.
Shen, Informing the Design of Direct-Touch Tabletops, 2006, 11 pgs.
Summons to oral proceedings, EP Application 08705751.9, Oct. 28, 2011, 9 pgs.
Summons to oral proceedings, EP Application 09154313.2, Jul. 18, 2013, 3 pgs.
Summons to oral proceedings, EP Application 09700006.1, Mar. 10, 2015, 9 pgs.
Summons to oral proceedings, EP Application 09700008.7, Mar. 10, 2015, 12 pgs.
Summons to oral proceedings, EP Application 12188748.3, Apr. 22, 2014, 3 pgs.
Supplemental Notice of Allowance, U.S. Appl. No. 13/620,390, Jan. 27, 2014, 2 pgs.
Tidwell, Magnetism, Designing Interfaces, Copyright © 2006 O'Reilly Media, Inc., pp. 279-280.
Touch Technology Handbook, Carroll Touch, 1998, 37 pgs.
Wagner & Geyer, Remarks for Consideration w/Annexes A11-A14, Aug. 10, 2012, 73 pgs.
Westerman, Hand Tracking Finger Identification and Chordic Manipulation on a Multi-touch Surface, Doctoral Dissertation, submitted Spring 1999, 363 pgs.
Withers Rogers, Comments on Sections 3.1 and 3.4 of the Withdrawn Appeal, Oct. 14, 2014, 3 pgs.
Withers Rogers, Grounds for Appeal, Aug. 4, 2014, 104 pgs.
Withers Rogers, Preliminar Response to Opponent O1's Written Submission, Dec. 3, 2013, 11 pgs.
Withers Rogers, Response to Preliminary Opinion of the Opposition Division, Dec. 3, 2013, 45 pgs.
Withers Rogers, Revised Second Auxiliary Request, Jan. 30, 2014, 14 pgs.
Zimmermann & Partner, Response to Patentee letter of Dec. 3, 2013, Jan. 3, 2014, 10 pgs.
Zimmermann & Partner, Response to Summons to Attend Oral Proceeding, Nov. 7, 2013, 33 pgs.
Notice of Allowance, dated Oct. 26, 2015, received in U.S. Appl. No. 13/084,472, 8 pages.
Office Action, dated Jan. 4, 2016, received in U.S. Appl. No. 14/171,680, 7 pages.
Notice of Allowance, dated Sep. 15, 2015, received in U.S. Appl. No. 14/180,267, 5 pages.
Notice of Allowance, dated Dec. 31, 2015, received in U.S. Appl. No. 14/180,267, 5 pages.
Extended European Search Report, dated Dec. 22, 2015, received in European Patent Application No. 15175530.3, which corresponds with U.S. Appl. No. 12/042,067, 9 pages.
International Search Report, dated Dec. 4, 2014, received in International Patent Application No. PCT/US2014/040406, which corresponds with U.S. Appl. No. 14/290,931, 4 pages.
International Preliminary Report on Patentability, dated Dec. 15, 2015, received in International Patent Application No. PCT/US2014/040406, which corresponds with U.S. Appl. No. 14/290,931, 6 pages.
Final Office Action, dated Feb. 22, 2016, received in U.S. Appl. No. 12/789,695, 16 pages.
Notice of Allowance, dated Feb. 11, 2016, received in U.S. Appl. No. 14/180,267, 2 pages.

\* cited by examiner ered by a user touching a web page with one or more fingers
TOUCH EVENT MODEL PROGRAMMING INTERFACE

RELATED APPLICATIONS

This application is a continuation application of U.S. patent application Ser. No. 12/042,299, filed Mar. 4, 2008, which is incorporated herein by reference in its entirety.

This application is related to U.S. patent application Ser. No. 12/042,237, filed Mar. 4, 2008, and U.S. patent application Ser. No. 12/042,067, filed Mar. 4, 2008, the contents of which are herein incorporated by reference in their entirety.

TECHNICAL FIELD

This subject matter is generally related to web browsing services.

BACKGROUND

Web pages are created using a markup language which provides a means to describe a structure of text-based information in a document and to supplement that text with interactive forms, embedded images, and other objects. One popular markup language is HyperText Markup Language (HTML) which is written in the form of tags surrounded by angle brackets. HTML can describe the appearance and semantics of a web page, and can include embedded scripting language code (e.g., JavaScript®) which can affect the behavior of web browsers and other HTML processors. JavaScript® provides developers with the ability to add mouse event handlers or event listeners in a web page. These mouse event handlers can be assigned to specific regions of the web page and configured to receive mouse events in those regions, such as mouse up or mouse down events.

By contrast, web pages that are navigated with a touch sensitive device often need to respond to touch events generated by a user touching a web page with one or more fingers and making gestures. Conventional mouse event handlers cannot correctly interpret these touch events. Thus touch events require a different touch event model to correctly interpret touch events and to allow developers to fully utilize the capabilities of a touch sensitive display or device.

SUMMARY

One or more touch input signals can be obtained from a touch sensitive device. A touch event model can be used to determine touch and/or gesture events based on the touch input signals. The touch and gesture events can be associated with touch input signals generated from different regions of a web page displayed on the touch sensitive device. Access can be provided to at least one touch or gesture event through a programming interface.

In some implementations, in a web browser, a method comprising: receiving a rotation value associated with a gesture event; and dynamically rotating an element of a web page associated with the gesture event in the web browser based on the rotation value, wherein the rotation value is a relative delta in degrees. The gesture event can includes two or more touch events.

In some implementations, in a web browser a method includes: receiving a scaling value associated with a gesture event; dynamically resizing an element of a web page associated with the gesture event in the web browser based on the scaling value, wherein the scaling value is a relative delta in document pixels. The gesture event can be associated with two or more touch events.

In some implementations, in a web browser, a method includes: receiving a touch list, the touch list including touch data to identify one or more touches on a web page, wherein the touch data includes a touch identifier and at least one set of touch location coordinates, wherein the touch list further includes data to a touch event target associated with each touch, wherein the at least one set of touch location coordinates includes a set of client coordinates, a set of page coordinates, and a set of screen coordinates. The touch data can identify one or more changed touches.

Other implementations are disclosed which are directed to systems, methods and computer-readable mediums.

DETAILED DESCRIPTION

Example Web Page Structure and DOM

Figure 1A:
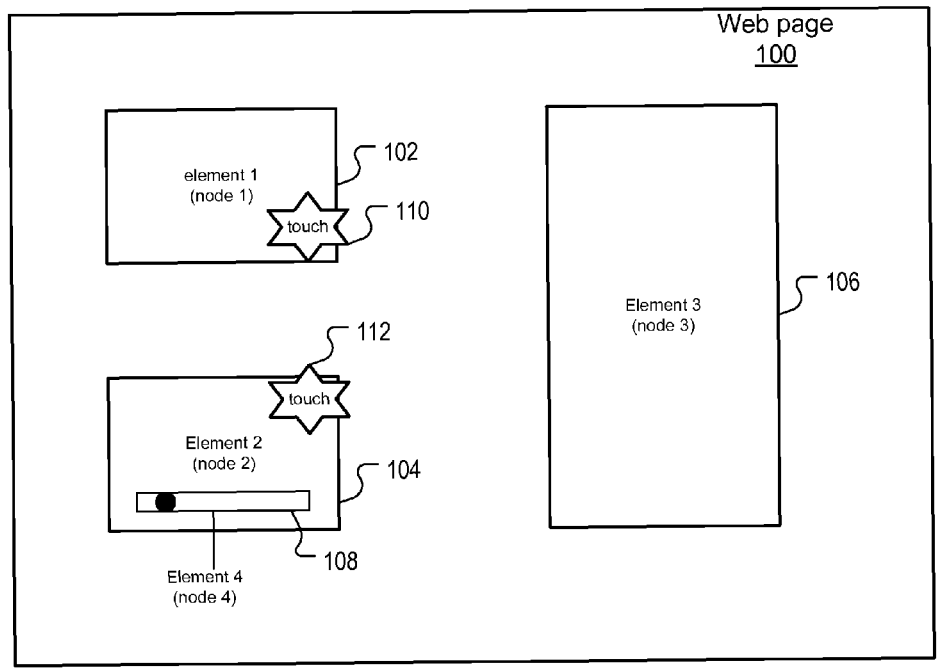
FIG. 1A illustrates an example web page document.

FIG. 1A shows an example web page 100 that can be displayed on a browser. The browser may be hosted on a portable device, such as the multi-touch capable device 400 of FIG. 4. One or more elements, element 102 ("element 1"), element 104 ("element 2"), and element 106 ("element 3") can be displayed on the web page 100. The elements 102, 104, 106 can correspond to regions of the web page 100 that a user can select and additional functionality can be provided as a result of the selection. The elements can, for example, correspond to buttons on the web page 100. The elements can also be nested so that one element contains another element. For example, element 104 contains element 108. In the example shown, the element 108 is a scrubber control nested within element 104 which can be a media player user interface, for example.

In some implementations, a user may perform various functions with the elements on the web page 100 using a finger instead of a mouse. The user can, for example, touch the elements of the web page 100 using the touch sensitive display 402 shown in FIG. 4. In one example, the user can select an element by touching the element with one or more fingers and/or making a gesture, such as a swiping, pinching or rotating motion. To recognize touch input signals, certain areas of the web page 100 may be associated with touch event handlers. This can be accomplished with a DOM and embedded scripting language, as will be described in reference to FIG. 1B.

Figure 1B:
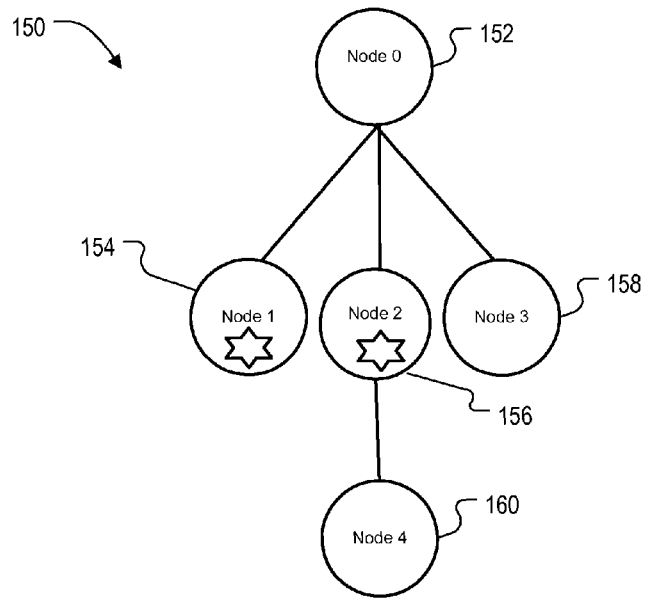
FIG. 1B illustrates an exemplary DOM associated with a web page.

FIG. 1B is an exemplary DOM 150 associated with the web page 100. The DOM 150 provides a structural representation of the web page 100 and describes the web page content as a set of objects that a scripting language (e.g., JavaScript®) can interpret. In some implementations, the DOM 150 provides access to the structure of a web page by mapping the elements 102, 104, 106, 108 in the web page 100 to individual nodes of a tree. For example, element 102 corresponds to node 154. Element 104 corresponds to node 156. Element 106 corresponds to node 158. Element 108 corresponds to node 160. The root node 152 corresponds to the overall web page 100.

In some implementations, one or more elements 102, 104, 106, 108 in web page 100 can be associated with one or more corresponding touch event handler by associating corresponding nodes in the DOM 150 with the touch event handlers. Touch event handlers can be inserted into HTML tags of the web page 100 and can execute a scripting language to perform an action when, for example, a user touches or gestures within one of the elements on the web page 100. For example, JavaScript® can work with the DOM 150 to attach actions to different touch events.

In some implementations, one or more elements 102, 104, 106, 108 can receive touch input which is detected by an event handler or listener. The touch input can be detected and processed into touch events by a touch event model which can be implemented in one or more layers of a software stack, as described in reference to FIG. 2. The touch events can be further processed by the web page 100. The touch events can be in a format (e.g., attributes) that are easier to use in an application than raw touch input signals generated by the touch sensitive device. For example, each touch event can include a set of coordinates at which a touch is currently occurring.

Each element in the web page 100, and its associated event handler, can receive, process and handle touch events. For example, if driver 202 (FIG. 2) senses a touch point 110 associated with element 102, or a touch point 112 associated with element 104, the event handlers associated with elements 102 or 104 can each receive a separate touch event indicating that the element has been touched and can optionally send the touch event to the web page 100 for further processing. In some implementations, if a region of the web page 100 is touched that does not correspond to an event handler, a browser in the applications layer 214 can process the input, instead of the web page 100.

In some implementations, a touch event can be detected per finger per node in the DOM 150. For example, a user can touch the touch sensitive display 402 at touch point 110 and touch point 112 at substantially the same time, and two separate touch events can be detected by the touch event model. A separate touch event can be detected for touch point 110 and touch point 112 because each node 102 and node 104 in the DOM 150 are associated with a separate touch event handler.

In some implementations, touch events can be delivered to the web page 100 as EventTargets. Some examples of touch events can include touchstart, touchmove, touchend, and touchcancel. Other touch events are possible. Touchstart is a touch event that is detected when a user first places a finger on the touch sensitive display 402 in a region on the web page 100 that is associated with an event handler. When the user moves his finger around on the web page 100, one or more touchmove events can be detected. When the user raises his finger off of the web page 100, a touchend event is detected. The touchcancel can be detected when the system interrupts regular event handling. For example, a touchcancel event can occur when the touch sensitive display 402 is locked out to prevent inadvertent touches.

In some implementations, gesture events can also be detected by combining two or more touch events. Like touch events, the gesture events (GestureEvents) can also be delivered to the web page 100 as EventTargets. Some examples of gesture events can be gesturestart, gesturechange, and gestureend. The gesture events can contain scale and/or rotation information. The rotation information can include a rotation value that is a relative delta in degrees. An element on the webpage 100 can be dynamically rotated base on the rotation value. The scale information can include a scaling value that is a relative delta in document pixels. An element on the webpage 100 associated with the gesture event can be dynamically resized based on the scaling value. Other gesture events are possible.

In some implementations, a touch list can be received that includes touch event data to identify one or more touches on the web page 100. The touch event data can include a touch identifier and at least one set of touch location coordinates. The touch list can also include touch event data to a touch event target associated with each touch. In some implementations, the one set of touch location coordinates can include client coordinates, page coordinates, and screen coordinates. In some implementations, the touch event data can identify one or more changed touches.

In some implementations, GestureEvents can be sent to the web page 100 before TouchEvents. For example, if a user places fingers on touch point 110 and touch point 112, then makes a rotating gesture with those fingers clockwise or counterclockwise on the touch sensitive display, the touch event model detects these multiple touch events and combines the touch events into a gesture event. The gesture event can then be sent to the web page 100, followed by the touch events that were combined to form the gesture event. This way, a developer has access to a gesture event and the individual touch events of the gesture event which provides the developer with more flexibility when developing a web application.

In some implementations, the touch events are received in the following order: a touchstart event, one or more touchmove events and a touchend or touchcancel event. Using the example of FIG. 1A, when the user touches touch point 110, a first touchstart event is detected by a first touch event handler associated with element 102. When the user touches touch point 112, a second touchstart event is detected by a second touch event handler associated with element 104. As the user rotates her fingers without lifting her fingers, the first and second touch event handlers detect touchmove events which can be interpreted by the touch event model as a rotation gesture event. When the user finishes the rotation and lifts her fingers from the web page 100, the first and second touch event handlers detect touchend events. All or some of these touch events can be made available to developers through a touch event Application Programming Interface (API). The touch API can be made available to developers as a Software Development Kit (SDK) or as part of an application (e.g., as part of a browser tool kit). The touch event API can rely on other services, frameworks and an operating system to perform its various functions. These services, frameworks and operating system can be part of a software or processing stack, as described in reference to FIG. 2, where the touch events are associated with attributes that can be inserted in documents to define event actions in an application.

Example IDL

An example touch event model will now be described in Interface Description Language (IDL). The functionality and data structures of the IDL can be accessed through an API by a web designer or application developer. Access to touch events and/or gesture events can be associated with attributes that can be inserted in an markup language document (e.g., HTML, XML) to define event actions in an application. For example, the attributes can be inserted in one or more HTML tags in an HTML document for generating the web page displayed on the touch sensitive display 402. The event actions can include running an embedded script (e.g., JavaScript®).

```
interface [
      Conditional=TOUCH_EVENTS,
      GenerateConstructor
] TouchEvent : UIEvent {
      void initTouchEvent(in AtomicString type,
            in boolean canBubble,
            in boolean cancelable,
            in DOMWindow view,
            in long detail,
            in long screenX,
            in long screenY,
            in long clientX,
            in long clientY,
            in boolean ctrlKey,
            in boolean altKey,
            in boolean shiftKey,
            in boolean metaKey,
            in TouchList touches,
            in TouchList targetTouches,
            in TouchList changedTouches,
            in long scale,
            in long rotation);
      readonly attribute TouchList touches;          // all touches
      readonly attribute TouchList targetTouches;    // all touches in this TouchEvent Target
      readonly attribute TouchList changedTouches;   // all touches changed in the current event
      readonly attribute long scale;
      readonly attribute long rotation;
      readonly attribute boolean ctrlKey;
      readonly attribute boolean shiftKey;
      readonly attribute boolean altKey;
      readonly attribute boolean metaKey;
};
interface [
      Conditional=TOUCH_EVENTS,
] Touch{
      readonly attribute EventTarget target;
      readonly attribute long identifier;
      readonly attribute long clientX;
      readonly attribute long clientY;
      readonly attribute long pageX;
      readonly attribute long pageY;
      readonly attribute long screenX;
      readonly attribute long screenY;
};
interface [
      Conditional=TOUCH_EVENTS,
      HasIndexGetter,
] TouchList {
      readonly attribute unsigned long length;
      Touch         item(in unsigned long index);
};
interface [
      Conditional=TOUCH_EVENTS,
      GenerateConstructor
] GestureEvent: UIEvent {
      void initGestureEvent( in AtomicString type,
            in boolean canBubble,
            in boolean cancelable,
            in DOMWindow view,
            in long detail,
            in long screenX,
            in long screenY,
            in long clientX,
            in long clientY,
            in boolean ctrlKey,
            in boolean altKey,
            in boolean shiftKey,
            in boolean metaKey,
            in EventTarget target,
            in long scale,
            in long rotation);
      readonly attribute EventTarget target;
      readonly attribute long scale;
      readonly attribute long rotation;
```

```
        readonly attribute boolean ctrlKey;
        readonly attribute boolean shiftKey;
        readonly attribute boolean altKey;
        readonly attribute boolean metaKey;
};
In Document.idl:
Touch           createTouch(in EventTarget target,
                in long identifier,
                in long clientX,
                in long clientY,
                in long pageX,
                in long pageY,
                in long screenX,
                in long screenY)
        raises (DOMException);
[Custom] TouchList       createTouchList( )
        raises (DOMException);
```

The following is example of HTML code snippet for processing touch events using the example IDL above. The HTML below shows, for example, that the touch event listener TouchStart and GestureStart were added to an element with the HTML code:

```
this.element.addEventListener('touchstart',     function(e)
{return self.on TouchStart(e)}, false);
this.element.addEventListener('gesturestart',   function(e)
{return self.onGestureStart(e)}, false);
```

The HTML code corresponding to the IDL above may be as follows:

```
<!DOCTYPE html PUBLIC "-//W3C//DTD HTML 4.01 Transitional//EN"
"http://www.w3.org/TR/html4/loose.dtd">
<html lang="en">
    <head>
        <meta http-equiv="Content-Type" content="text/html; charset=utf-8">
            <meta name="viewport" content="initial-scale=1.0" />
            <title>Transform Gestures</title>
            <style type="text/css" media="screen">
                .box {
                    position: absolute;
                    height: 150px;
                    width: 150px;
                    background-color: blue;
                }
                .box:active {
                    background-color: red;
                }
                body {
                    margin: 0px;
                }
                #container {
                    position: absolute;
                    width: 100%;
                    height: 100%;
                }
                #main-box2 {
                    top: 10px;
                    left: 155px;
                    background: red;
                    z-index: 1;
                }
            </style>
            <script type="text/javascript" charset="utf-8">
                var trackedObjectCount = 0;
                function Box(inElement)
                {
                    var self = this;
                    this.element = inElement;
                    this.scale = 1.0;
                    this.rotation = 0;
                    this.position = '0,0';
                    this.element.addEventListener('touchstart', function(e) {return self.onTouchStart(e)},
false);
                    this.element.addEventListener('gesturestart', function(e) {return self.onGestureStart(e)},
false);
                }
                Box.prototype = {
                    // position strings are "x,y" with no units
                    get position( )
```

-continued

```
        {
            return this._position;
        },
        set position(pos)
        {
            this._position = pos;
            var components = pos.split(',')
            var x = components[0];
            var y = components[1];
            const kUseTransform = true;
            if (kUseTransform) {
                this.element.style.webkitTransform = 'rotate(' + this.rotation + 'deg) scale(' + this.scale + ') translate(' + x + 'px,' + y + 'px)';
            }
            else {
                this.element.style.left = x + 'px';
                this.element.style.top = y + 'px';
            }
        },
        get x( )
        {
            return parseInt(this._position.split(',')[0]);
        },
        set x(inX)
        {
            var comps = this._position.split(',');
            comps[0] = inX;
            this.position = comps.join(',');
        },
        get y( )
        {
            return parseInt(this._position.split(',')[1]);
        },
        set y(inY)
        {
            var comps = this._position.split(',');
            comps[1] = inY;
            this.position = comps.join(',');
        },
        filterEvent: function(e)
        {
            // Prevent the browser from doing its default thing (scroll, zoom)
            e.preventDefault( );
            // Event listeners are added at the document level, so we receive gesturechange events for other elements.
            return (e.target == this.element);
        },
        onTouchStart: function(e)
        {
            if (!this.filterEvent(e))
                return false;
            // Start tracking when the first finger comes down in this element
            if (e.targetTouches.length != 1)
                return false;
            this.startX = e.targetTouches[0].clientX;
            this.startY = e.targetTouches[0].clientY;
            var self = this;
            if (!("touchMoveHandler" in this)) {
                this.touchMoveHandler = function(e) {return self.onTouchMove(e)}
                this.touchEndHandler = function(e) {return self.onTouchEnd(e)}
            }
            document.addEventListener('touchmove', this.touchMoveHandler, false);
            document.addEventListener('touchend', this.touchEndHandler, false);
            trackedObjectCount++;
            return false;
        },
        onTouchMove: function(e)
        {
            if (!this.filterEvent(e))
                return false;
            // Don't track motion when multiple touches are down in this element (that's a gesture)
            if (e.targetTouches.length != 1)
                return false;
            var leftDelta = e.targetTouches[0].clientX - this.startX;
            var topDelta = e.targetTouches[0].clientY - this.startY;
            var newLeft = (this.x) + leftDelta;
            var newTop = (this.y) + topDelta;
            this.position = newLeft + ',' + newTop;
            this.startX = e.targetTouches[0].clientX;
```

```
                this.startY = e.targetTouches[0].clientY;
                return false;
            },
            onTouchEnd: function(e)
            {
                if (!this.filterEvent(e))
                    return false;
                // Stop tracking when the last finger is removed from this element
                if (e.targetTouches.length > 0)
                    return false;
                document.removeEventListener('touchmove', this.touchMoveHandler, false);
                document.removeEventListener('touchend', this.touchEndHandler, false);
                trackedObjectCount--;
                return false;
            },
            onGestureStart: function(e)
            {
                if (!this.filterEvent(e))
                    return false;
                var self = this;
                if (!("gestureChangeHandler" in this)) {
                    this.gestureChangeHandler = function(e) {return self.onGestureChange(e)}
                    this.gestureEndHandler = function(e) {return self.onGestureEnd(e)}
                }
                document.addEventListener('gesturechange', this.gestureChangeHandler, true);
                document.addEventListener('gestureend', this.gestureEndHandler, true);
                return false;
            },
            onGestureChange: function(e)
            {
                if (!this.filterEvent(e))
                    return false;
                // Only interpret gestures when tracking one object. Otherwise, interpret raw touch events
                // to move the tracked objects,
                if (trackedObjectCount == 1) {
                    this.scale += e.scaling * 0.01;
                    this.rotation += e.rotation / 2;
                    this.position = this.position;
                }
                return false;
            },
            onGestureEnd: function(e)
            {
                if (!this.filterEvent(e))
                    return false;
                document.removeEventListener('gesturechange', this.gestureChangeHandler, true);
                document.removeEventListener('gestureend', this.gestureEndHandler, true);
                return false;
            },
        }
        function loaded( )
        {
            newBox(document.getElementById('main-box'));
            newBox(document.getElementById('main-box2'));
        }
        window.addEventListener('load', loaded, true);
    </script>
</head>
<body>
    <div id="container">
        <div id="main-box" class="box"></div>
        <div id="main-box2" class="box"></div>
    </div>
</body>
</html>
```

Example Processing Stack for Multi-Touch Device

Figure 2:
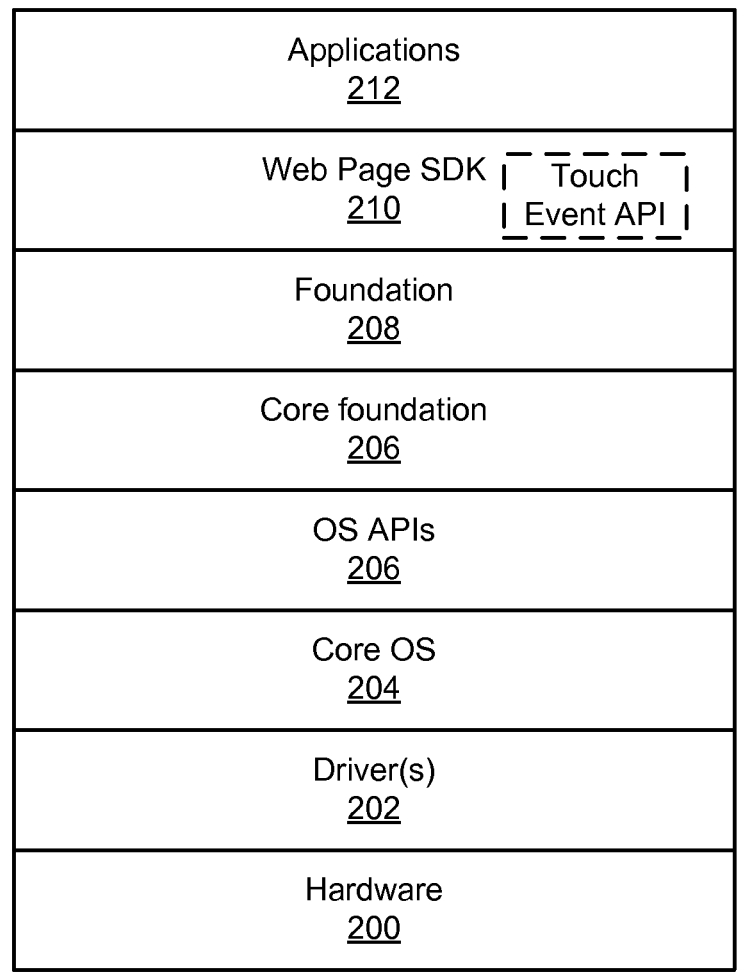
FIG. 2 illustrates a processing stack of an example multi-touch capable device.

FIG. 2 is a diagram of a processing stack of an example multi-touch capable device. The touch event model described above can be implemented in one or more regions of the processing stack and user various resources in the stack. The hardware 200 layer can include various hardware interface components, such as a touch sensitive or enabled device or touch sensitive display. The touch sensitive device can include a display and a panel that senses multiple touches simultaneously. The hardware layer 200 can also include an accelerometer for detecting an orientation of the touch sensitive display or device (e.g., portrait, landscape). Thus signals indicative of orientation can be used by the touch event model to scale web pages for optimum display.

One or more drivers in a driver layer 202 can communicate with the hardware 200. For example, the drivers can receive and process touch input signals generated by the touch sensitive display or device in the hardware layer 200. A core Operating System (OS) 204 can communicate with the driver(s). The core OS 204 can process raw input data received from the driver(s). In some embodiments, the drivers can be considered to be a part of the core OS 204.

A set of OS application programming interfaces (APIs) 206 can communicate with the core OS 204. These APIs can be a set of APIs that are usually included with operating systems (such as, for example, Linux or UNIX APIs). A set of core foundation APIs 208 can utilize the OS APIs 206, and a set of foundation APIs 210 can utilize the core foundation APIs 208.

Web page software development kit (SDK) 210 can include a set of APIs designed for use by applications running on the device. The touch event APIs can, for example, be included in the Web page SDK 210. The APIs of the Web page SDK 210 can utilize the foundation APIs 208. The Web page SDK 210 can, for example, include Web KIT provided by Apple Inc. The Web page SDK 210 can be offered as an API or can be accessible through an application, for example, a browser such as SAFARI®, provided by Apple Inc.

Applications 214 running on the device can utilize the APIs of the Web page SDK 210 to create web pages. The APIs of the Web page SDK 210 can, in turn, communicate with lower level elements, ultimately communicating with the touch sensitive display or device and various other user interface hardware. While each layer can utilize the layer underneath it, that is not always required. For example, in some embodiments, applications 214 can occasionally communicate with OS APIs 206.

Example Touch Event Process

Figure 3:
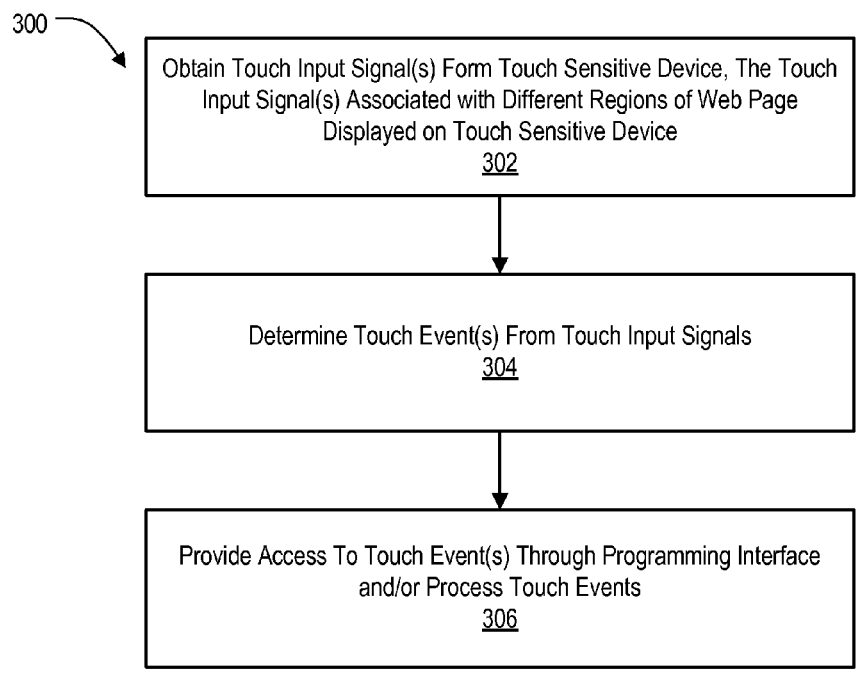
FIG. 3 is a flow diagram of an example process for processing touch events.

FIG. 3 is a flow diagram of a process 300 for providing access to touch and/or gesture events though an API. The process 300 can begin by obtaining one or more touch input signals (302). The touch input signals can be obtained from a touch sensitive display or device. A determination of touch events and/or gestures can be made based on the touch input signals using a touch event model (304). The touch events can be associated with regions of a web page displayed on a touch sensitive display or device. For example, the touch sensitive display can be a display on a mobile phone, and a touch sensitive device can be a touch sensitive pad on a notebook computer. Access to touch events and/or gesture events can be provided through a programming interface (306). For example, with respect to the HTML snippet described above with reference to FIG. 2, the snippet can be inserted into an HTML document by the web developer to provide the developer with access to touch and/or gesture events. The touch events and/or gesture events can be further processed by code in the HTML document to initiate event actions (306).

Mobile Device Overview

Figure 4:
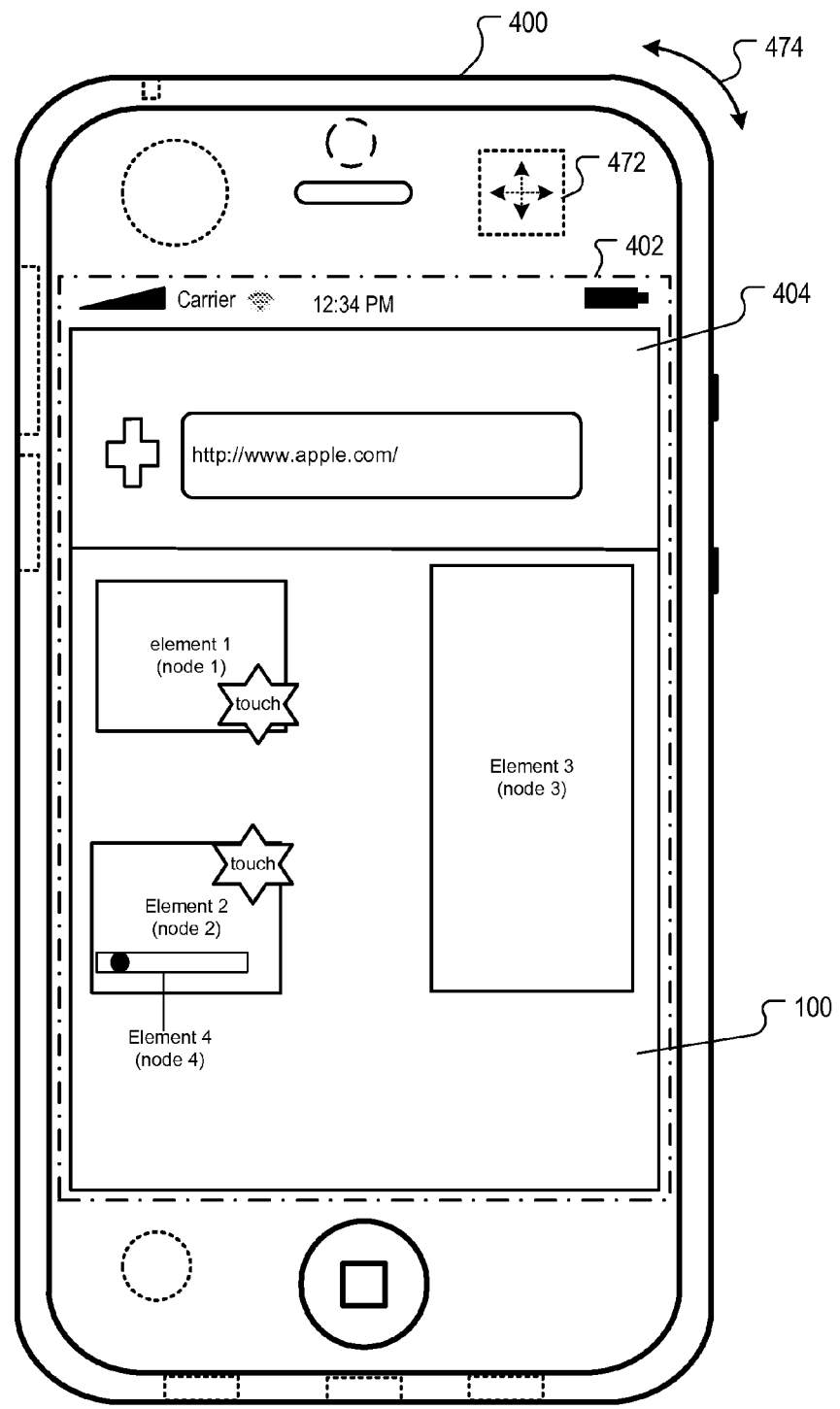
FIG. 4 illustrates an example multi-touch capable device.

FIG. 4 is a block diagram of an example multi-touch capable device 400. In some implementations, the multi-touch capable device 400 includes a touch sensitive display 402. The touch sensitive display 402 can implement liquid crystal display (LCD) technology, light emitting polymer display (LPD) technology, or some other display technology. The touch sensitive display 402 can be sensitive to haptic and/or tactile contact with a user.

In some implementations, the touch sensitive display 402 can comprise a multi-touch sensitive display 402. A touch sensitive display 402 can, for example, process multiple simultaneous touch points, including processing data related to the pressure, degree and/or position of each touch point. Such processing facilitates gestures and interactions with multiple fingers, chording, and other interactions. Other touch sensitive display technologies can also be used, e.g., a display in which contact is made using a stylus or other pointing device. Some examples of multi-touch sensitive display technology are described in U.S. Pat. Nos. 6,323,846, 6,570,557, 6,677,932, and U.S. Patent Publication 2002/0015024A1, each of which is incorporated by reference herein in its entirety. In some implementations, the multi-touch capable device 400 can display one or more graphical user interfaces on the touch sensitive display 402 for providing the user access to various system objects and for conveying information to the user.

Example Multi-Touch Capable Device Functionality

In some implementations, the multi-touch capable device 400 can implement multiple device functionalities, such as a telephony device, an e-mail device, a network data communication device, a Wi-Fi base station device, and a media processing device. In some implementations, the multi-touch capable device 400 can include a web browser 404 for displaying web pages (e.g., web page 100). The touch sensitive display 402 can receive touch input signals made on the web page 100 and the touch model described above can be used to determine touch and/or gesture events based on the touch input signals. In some implementations, the multi-touch capable device 400 can implement network distribution functionality. In some implementations, the touch sensitive display 402 can be locked down when the multi-touch capable device 400 is proximate to the user's ear. This lockdown would cause a touchcancel event as described in reference to FIG. 1B.

In some implementations, an accelerometer 472 can be utilized to detect movement of the multi-touch capable device 400, as indicated by the directional arrow 474. Accordingly, display objects and/or media can be presented according to a detected orientation, e.g., portrait or landscape. In some implementations, the multi-touch capable device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the multi-touch capable device 400 or provided as a separate device that can be coupled to the multi-touch capable device 400 through an interface to provide access to location-based services. The multi-touch capable device 400 can also include one or more wireless communication subsystems.

In some implementations, a port device, e.g., a Universal Serial Bus (USB) port, or a docking port, or some other wired port connection, can be included. The port device can, for example, be utilized to establish a wired connection to other computing devices, such as other multi-touch capable devices 400, network access devices, a personal computer, a printer, or other processing devices capable of receiving and/or transmitting data. In some implementations, the port device allows the multi-touch capable device 400 to synchronize with a host device using one or more protocols, such as, for example, the TCP/IP, HTTP, UDP and any other known protocol.

Network Operating Environment

Figure 5:
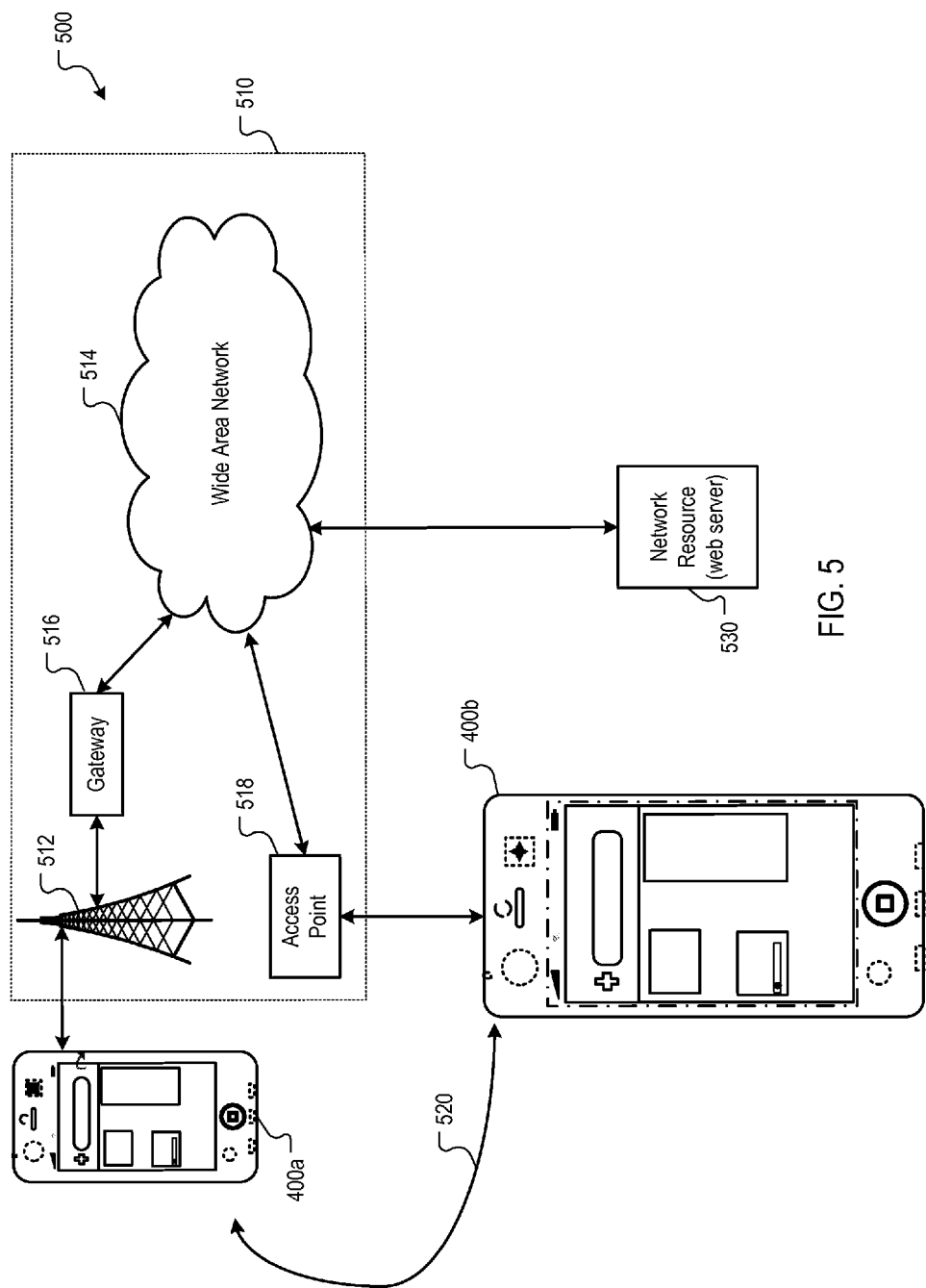
FIG. 5 is a block diagram of an example network operating environment for the multi-touch capable device of FIG. 4.

FIG. 5 is a block diagram of an example network operating environment 600 for the multi-touch capable device 400 of FIG. 4. The multi-touch capable device 400 of FIG. 4 can, for example, communicate over one or more wired and/or wireless networks 510 in data communication. For example, a wireless network 512, e.g., a cellular network, can communicate with a wide area network (WAN) 514, such as the Internet, by use of a gateway 516. Likewise, an access point 518, such as an 802.11g wireless access point, can provide communication access to the wide area network 514. In some implementations, both voice and data communications can be established over the wireless network 512 and the access point 518. For example, the multi-touch capable device 400a can place and receive phone calls (e.g., using VoIP protocols), send and receive e-mail messages (e.g., using POP3 protocol), and retrieve electronic documents and/or streams, such as web pages, photographs, and videos, over the wireless network 512, gateway 516, and wide area network 514 (e.g., using TCP/IP or UDP protocols). Likewise, the multi-touch capable device 400b can place and receive phone calls, send and receive e-mail messages, and retrieve electronic documents over the access point 518 and the wide area network 514. In some implementations, the multi-touch capable device 400 can be physically connected to the access point 518 using one or more cables and the access point 518 can be a personal computer. In this configuration, the multi-touch capable device 400 can be referred to as a "tethered" device.

The multi-touch capable devices 400a and 400b can also establish communications by other means. For example, the multi-touch capable device 400a can communicate with other wireless devices, e.g., other multi-touch capable devices 400, cell phones, etc., over the wireless network 512. Likewise, the multi-touch capable device 400a and 400b can establish peer-to-peer communications 520, e.g., a personal area network, by use of one or more communication subsystems, such as the Bluetooth™ communication device 488 shown in FIG. 4. Other communication protocols and topologies can also be implemented.

The multi-touch capable device 400 can, for example, communicate with a network resource 530 over the one or more wired and/or wireless networks 510. For example, the network resource can be a web server for delivering web pages which can be touched via the touch model, as described in reference to FIGS. 1-2.

Other services can also be provided, including a software update service that automatically determines whether software updates exist for software on the multi-touch capable device 400, then downloads the software updates to the multi-touch capable device 400 where it can be manually or automatically unpacked and/or installed.

Example Mobile Device Architecture

Figure 6:
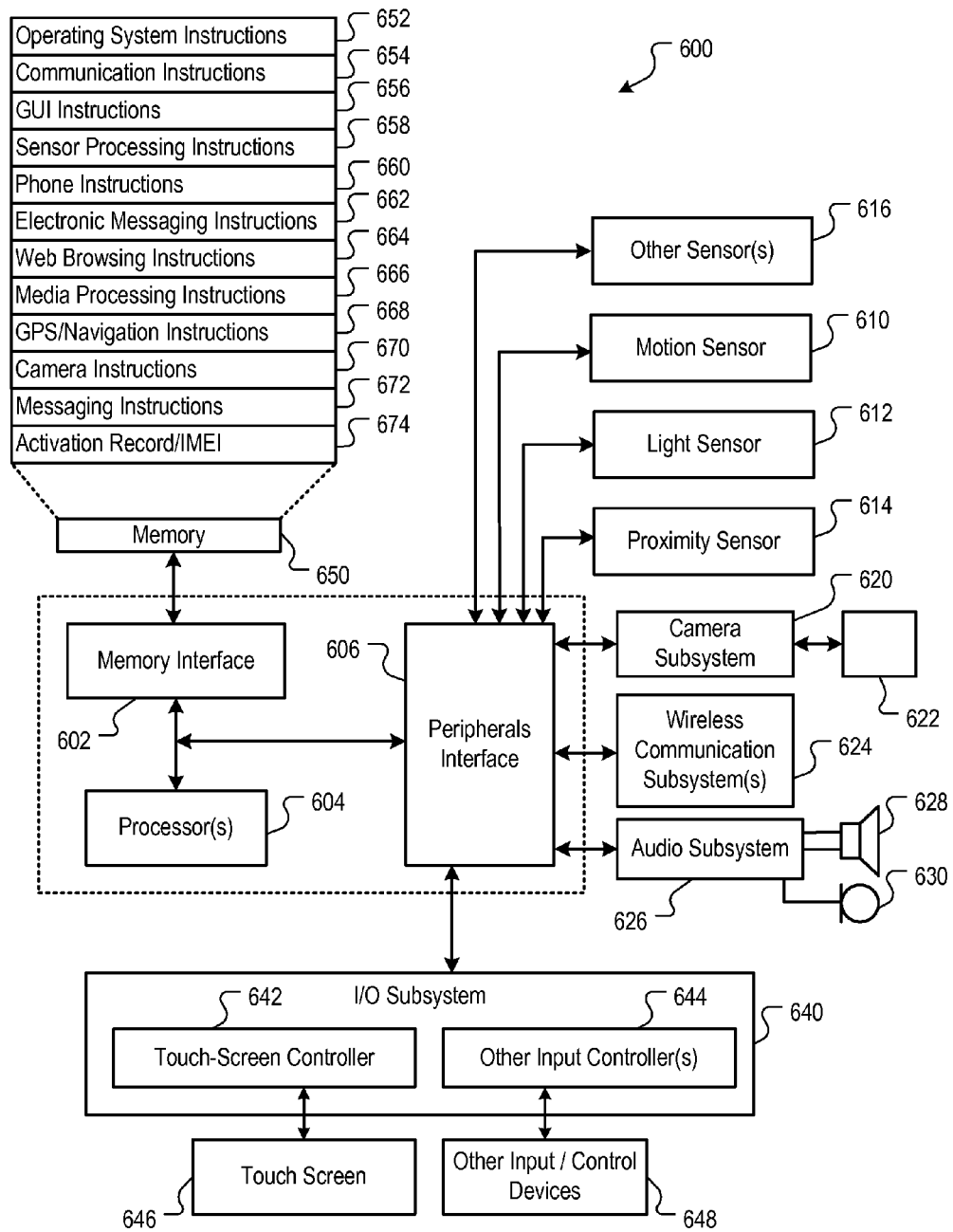
FIG. 6 is a block diagram of an example implementation of the multi-touch capable device of FIG. 4.

FIG. 6 is a block diagram 600 of an example implementation of the multi-touch capable device 400 of FIG. 4. The multi-touch capable device 400 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the multi-touch capable device 400 can be coupled by one or more communication buses or signal lines.

Sensors, devices and subsystems can be coupled to the peripherals interface 606 to facilitate multiple functionalities. For example, a motion sensor 610, a light sensor 612, and a proximity sensor 614 can be coupled to the peripherals interface 606 to facilitate the orientation, lighting and proximity functions described with respect to FIG. 4. Other sensors 616 can also be connected to the peripherals interface 606, such as a positioning system (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the multi-touch capable device 400 is intended to operate. For example, a multi-touch capable device 400 may include communication subsystems 624 designed to operate over a GSM network, a GPRS network, an EDGE network, a Wi-Fi or WiMax network, and a Bluetooth™ network. In particular, the wireless communication subsystems 624 may include hosting protocols such that the device 500 may be configured as a base station for other wireless devices.

An audio subsystem 626 can be coupled to a speaker 628 and a microphone 630 to facilitate voice-enabled functions, such as voice recognition, voice replication, digital recording, and telephony functions.

The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration may disengage a lock of the touch screen 646; and a pressing of the button for a second duration that is longer than the first duration may turn power to the multi-touch capable device 400 on or off. The user may be able to customize a functionality of one or more of the buttons. The touch screen 646 can, for example, also be used to implement virtual or soft buttons and/or a keypad or keyboard.

In some implementations, the multi-touch capable device 400 can present recorded audio and/or video files, such as MP3, AAC, and MPEG files. In some implementations, the multi-touch capable device 400 can include the functionality of an MP3 player, such as an iPod™. The multi-touch capable device 400 may, therefore, include a 32-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks. The operating system 652 may include instructions for handling basic system services and for performing hardware dependent tasks.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and/or other messaging instructions 672 to facilitate processes and functions, as described in reference to FIGS. 1-5.

Each of the above identified instructions and applications can correspond to a set of instructions for performing one or more functions described above. These instructions need not be implemented as separate software programs, procedures or modules. The memory 650 can include additional instructions or fewer instructions. Furthermore, various functions of the multi-touch capable device 400 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a device that includes one or more processors and memory storing one or more instructions for execution by the one or more processors, the method comprising:
   receiving touch input signals associated with a respective region of a web page, wherein the respective region of the web page is associated with a plurality of event handlers or event listeners including an event handler or listener for a touch event and an event handler or listener for a gesture event; and
   in response to receiving the touch input signals:
      sending a gesture event to the web page, the gesture event corresponding to a combination of two or more touch events, the two or more touch events corresponding to the touch input signals;
      dynamically rotating an element associated with the respective region of the web page with the event handler or listener for the gesture event based on a rotation value associated with the gesture event; and
      sending the touch events to the web page for processing, the processing distinct from the dynamically rotating.

2. The method of claim 1, wherein the rotation value is a relative delta in degrees.

3. The method of claim 1, wherein the processing includes moving the element associated with the respective region of the web page.

4. The method of claim 1, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

5. A method performed by a device that includes one or more processors and memory storing one or more instructions for execution by the one or more processors, the method comprising:
receiving touch input signals associated with a respective region of a web page, wherein the respective region of the web page is associated with a plurality of event handlers or event listeners including an event handler or listener for a touch event and an event handler or listener for a gesture event; and
in response to receiving the touch input signals:
sending a gesture event to the web page, the gesture event corresponding to a combination of two or more touch events, the two or more touch events corresponding to the touch input signals;
dynamically resizing an element associated with the respective region of the web page with the event handler or listener for the gesture event based on a scaling value associated with the gesture event; and
sending the touch events to the web page for processing, the processing distinct from the dynamically resizing.

6. The method of claim 5, wherein the scaling value is a relative delta in document pixels.

7. The method of claim 5, wherein the processing includes moving the element associated with the respective region of the web page.

8. The method of claim 5, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

9. A method performed by a device that includes one or more processors and memory storing one or more instructions for execution by the one or more processors, the method comprising:
receiving a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

10. The method of claim 9, wherein the touch event data identifies one or more changed touches.

11. A non-transitory computer-readable medium having instructions stored thereon, which, when executed by one or more processors of a device, cause the device to perform operations comprising:
receiving touch input signals associated with a respective region of a web page, wherein the respective region of the web page is associated with a plurality of event handlers or event listeners including an event handler or listener for a touch event and an event handler or listener for a gesture event; and
in response to receiving the touch input signals:
sending a gesture event to the web page, the gesture event corresponding to a combination of two or more touch events, the two or more touch events corresponding to the touch input signals;
dynamically rotating an element associated with the respective region of the web page with the event handler or listener for the gesture event based on a rotation value associated with the gesture event; and
sending the touch events to the web page for processing distinct from the dynamically rotating.

12. The computer-readable medium of claim 11, wherein the rotation value is a relative delta in degrees.

13. The computer-readable medium of claim 11, wherein the processing includes moving the element associated with the respective region of the web page.

14. The computer-readable medium of claim 11, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

15. A non-transitory computer-readable medium having instructions stored thereon, which, when executed by one or more processors of a device, cause the device to perform operations comprising:
receiving touch input signals associated with a respective region of a web page, wherein the respective region of the web page is associated with a plurality of event handlers or event listeners including an event handler or listener for a touch event and an event handler or listener for a gesture event; and
in response to receiving the touch input signals:
sending a gesture event to the web page, the gesture event corresponding to a combination of two or more touch events, the two or more touch events corresponding to the touch input signals;
dynamically resizing an element associated with the respective region of the web page with the event handler or listener for the gesture event based on a scaling value associated with the gesture event; and
sending the touch events to the web page for processing distinct from the dynamically resizing.

16. The computer-readable medium of claim 15, wherein the scaling value is a relative delta in document pixels.

17. The computer-readable medium of claim 15, wherein the processing includes moving the element associated with the respective region of the web page.

18. The computer-readable medium of claim 15, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

19. A non-transitory computer-readable medium having instructions stored thereon, which, when executed by one or more processors of a device, cause the device to perform operations comprising:

receiving a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

20. The computer-readable medium of claim 19, wherein the touch event data identifies one or more changed touches.

21. An electronic device, comprising:

one or more processors; and memory storing one or more programs for execution by the one or more processors, the one or more programs including instructions for:

receiving touch input signals associated with a respective region of a web page, wherein the respective region of the web page is associated with a plurality of event handlers or event listeners including an event handler or listener for a touch event and an event handler or listener for a gesture event; and in response to receiving the touch input signals:

sending a gesture event to the web page, the gesture event corresponding to a combination of two or more touch events, the two or more touch events corresponding to the touch input signals;

dynamically rotating an element associated with the respective region of the web page with the event handler or listener for the gesture event based on a rotation value associated with the gesture event; and sending the touch events to the web page for processing, the processing distinct from the dynamically rotating.

22. The device of claim 21, wherein the rotation value is a relative delta in degrees.

23. The device of claim 21, wherein the processing includes moving the element associated with the respective region of the web page.

24. The device of claim 21, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

25. An electronic device, comprising:

one or more processors; and memory storing one or more programs for execution by the one or more processors, the one or more programs including instructions for:

receiving touch input signals associated with a respective region of a web page, wherein the respective region of the web page is associated with a plurality of event handlers or event listeners including an event handler or listener for a touch event and an event handler or listener for a gesture event; and in response to receiving the touch input signals:

sending a gesture event to the web page, the gesture event corresponding to a combination of two or more touch events, the two or more touch events corresponding to the touch input signals;

dynamically resizing an element associated with the respective region of the web page with the event handler or listener for the gesture event based on a scaling value associated with the gesture event; and sending the touch events to the web page for processing, the processing distinct from the dynamically resizing.

26. The device of claim 25, wherein the scaling value is a relative delta in document pixels.

27. The device of claim 25, wherein the processing includes moving the element associated with the respective region of the web page.

28. The device of claim 25, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

29. An electronic device, comprising:

one or more processors; and memory storing one or more programs for execution by the one or more processors, the one or more programs including instructions for:

receiving a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

30. The device of claim 29, wherein the touch event data identifies one or more changed touches.

31. An electronic device, comprising:

one or more processors; and memory storing one or more programs for execution by the one or more processors, the one or more programs including instructions for:

receiving touch input signals associated with a respective region of a web page, wherein the respective region of the web page is associated with a plurality of event handlers or event listeners including an event handler or listener for a touch event and an event handler or listener for a gesture event; and in response to receiving the touch input signals:

generating two or more touch events based on the touch input signals;

generating a gesture event by combining the touch events;

sending the gesture event to the web page;

dynamically rotating an element associated with the respective region of the web page with the event handler or listener for the gesture event based on a rotation value associated with the gesture event; and sending the touch events to the web page for processing, the processing distinct from the dynamically rotating.

32. The device of claim 31, wherein the rotation value is a relative delta in degrees.

33. The device of claim 31, wherein the processing includes moving the element associated with the respective region of the web page.

34. The device of claim 31, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

35. An electronic device, comprising:
one or more processors; and
memory storing one or more programs for execution by the one or more processors, the one or more programs including instructions for:
receiving touch input signals associated with a respective region of a web page, wherein the respective region of the web page is associated with a plurality of event handlers or event listeners including an event handler or listener for a touch event and an event handler or listener for a gesture event; and
in response to receiving the touch input signals:
generating two or more touch events based on the touch input signals;
generating a gesture event by combining the touch events;
sending the gesture event to the web page;
dynamically resizing an element associated with the respective region of the web page with the event handler or listener for the gesture event based on a scaling value associated with the gesture event; and
sending the touch events to the web page for processing, the processing distinct from the dynamically rotating.

36. The device of claim 35, wherein the scaling value is a relative delta in document pixels.

37. The device of claim 35, wherein the processing includes moving the element associated with the respective region of the web page.

38. The device of claim 35, wherein a respective touch event includes a touch list, the touch list including touch event data to identify one or more touches on a web page, wherein the touch event data includes a touch identifier and at least one set of touch location coordinates, wherein the touch list further includes a touch event target associated with a respective touch, wherein the at least one set of touch location coordinates includes at least one of client coordinates, page coordinates, and screen coordinates.

39. An electronic device, comprising:
one or more processors; and
memory storing one or more programs for execution by the one or more processors, the one or more programs including instructions for:
receiving a touch list, the touch list including touch event data to identify one or more touches on a web page, wherein the touch event data includes a touch identifier and at least one set of touch location coordinates, wherein the touch list further includes a touch event target associated with each touch, wherein the at least one set of touch location coordinates includes at least one of client coordinates, page coordinates, and screen coordinates.

40. The device of claim 39, wherein the touch event data identifies one or more changed touches.

* * * * *